(12) United States Patent
Ono et al.

(10) Patent No.: US 7,693,308 B2
(45) Date of Patent: Apr. 6, 2010

(54) AUTHENTICATION SYSTEM, AUTHENTICATION METHOD, MACHINE READABLE MEDIUM STORING THEREON AUTHENTICATION PROGRAM, CERTIFICATE PHOTOGRAPH TAKING APPARATUS, AND CERTIFICATE PHOTOGRAPH TAKING METHOD

(75) Inventors: Shuji Ono, Kanagawa (JP); Akira Yoda, Kanagawa (JP); Kazuhiro Mino, Kanagawa (JP); Katsuo Ogura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 1391 days.

(21) Appl. No.: 11/045,495

(22) Filed: Jan. 31, 2005

(65) Prior Publication Data

US 2010/0034432 A1 Feb. 11, 2010

(30) Foreign Application Priority Data

| Mar. 24, 2004 | (JP) | ............................. 2004-087860 |
| Mar. 24, 2004 | (JP) | ............................. 2004-088004 |
| Dec. 22, 2004 | (JP) | ............................. 2004-372184 |

(51) Int. Cl.
 *G06K 9/00* (2006.01)
(52) U.S. Cl. ........................ 382/118; 340/5.2; 340/5.83; 382/103; 382/154
(58) Field of Classification Search ................ 345/156, 345/164; 382/103, 115, 118, 154; 340/5.2, 340/5.83
See application file for complete search history.

(56) References Cited

U.S. PATENT DOCUMENTS

| 5,940,139 | A * | 8/1999 | Smoot ........................ 348/584 |
| 6,424,373 | B1 * | 7/2002 | Misue et al. ........... 348/211.99 |
| 6,680,745 | B2 * | 1/2004 | Center et al. ............. 348/14.16 |
| 6,873,713 | B2 * | 3/2005 | Okazaki et al. ............. 382/118 |
| 7,127,086 | B2 * | 10/2006 | Yuasa et al. ................. 382/118 |
| 7,239,725 | B2 * | 7/2007 | Dobashi ..................... 382/118 |
| 7,324,670 | B2 * | 1/2008 | Kozakaya et al. ........... 382/118 |
| 7,421,097 | B2 * | 9/2008 | Hamza et al. ............... 382/118 |
| 2001/0031072 | A1 * | 10/2001 | Dobashi et al. ............. 382/118 |
| 2002/0191819 | A1 * | 12/2002 | Hashimoto et al. .......... 382/118 |
| 2003/0174868 | A1 * | 9/2003 | Adachi et al. ............... 382/118 |
| 2003/0202685 | A1 * | 10/2003 | Shimizu et al. ............. 382/118 |
| 2004/0001647 | A1 * | 1/2004 | Lake et al. .................. 382/291 |
| 2006/0061598 | A1 * | 3/2006 | Mino et al. ................. 345/629 |
| 2007/0046662 | A1 * | 3/2007 | Kawakami et al. .......... 345/419 |

* cited by examiner

*Primary Examiner*—Gregory M Desire
(74) *Attorney, Agent, or Firm*—Sughrue Mion, PLLC

(57) ABSTRACT

A face image in which a user's face turns to a direction different from the front is picked up clearly and individual authentication is executed more precisely. An authentication system for executing authentication of a user is provided, wherein the authentication system comprises a first image pickup unit for picking up a face image of the user; a second image pickup unit for picking up a face image of the user from a direction different from that of the first image pickup unit, a direction calculation unit for acquiring a direction to which the user's face turns on the basis of the face images picked up by the first and the second image pickup units, and a selection unit for selecting at least one of the face images picked up by the first and second image pickup units on the basis of the direction to which the user's face turns.

24 Claims, 14 Drawing Sheets

AUTHENTICATION SYSTEM, AUTHENTICATION METHOD, MACHINE READABLE MEDIUM STORING THEREON AUTHENTICATION PROGRAM, CERTIFICATE PHOTOGRAPH TAKING APPARATUS, AND CERTIFICATE PHOTOGRAPH TAKING METHOD

BACKGROUND OF THE INVENTION

The present application claims priority from Japanese Patent. Applications Nos. 2004-088004 filed on Mar. 24, 2004 and 2004-372184 filed on Dec. 22, 2004, the contents of both of which are incorporated herein by reference for all purposes.

FIELD OF THE INVENTION

The present invention relates to an authentication system, an authentication method, a machine readable medium storing thereon an authentication program, a certificate photograph taking apparatus, and a certificate photograph taking method. More particularly, the present invention relates to an authentication system, an authentication method, and a machine readable medium storing thereon an authentication program for executing authentication of a user making use of a face image of the user, and a certificate photograph taking apparatus and a certificate photograph taking method, which pick up a face image of the user, print out the image, and issue the printed-out image as a certificate photograph.

DESCRIPTION OF THE RELATED ART

Recently, research and development of individual authentication techniques using biometrics information such as face images, fingerprints, and the like, have been accomplished. For example, personal differences in location of feature points such as eyes, a nose, a mouth, and the like, have been used. Thus, in order to execute the individual authentication precisely, it is desirable to have three-dimensional positional information of these kinds of feature points. In this case, a face image to be used for authentication has to be picked up from a different direction from the front of the subject.

In case of executing the individual authentication by a face image making use of the depth information of the feature points, the direction of the subject's face which makes the user distinguishable from other persons most easily, has been studied by Yu Takahashi, Shigeo Morisima, etc. of the Engineering department of Seikei University.

Since prior art references have not been found up to the present, the description regarding the prior art references is omitted.

SUMMARY OF THE INVENTION

However, for picking up a face image used in individual authentication, there are frequent occasions when it is difficult to previously specify the direction to which the face of a subject turns. Further, in case that the direction doesn't make a user easily distinguishable from other persons, it is difficult to execute the individual authentication precisely.

In addition, conventional certificate photograph taking apparatus take a certificate photograph of which the subject turns to the front, and it was difficult to take a picture of which the subject turns to different direction with a p-roper composition. Thus, in case of executing the individual authentication making use of the certificate photograph taken by the conventional certificate photograph taking apparatus, it was impossible to extract information enough for specifying an individual from the certificate photograph and the certificate photograph could not be used when a precise individual authentication was required.

Accordingly, an object of the present invention is to provide an authentication system, an authentication method, a machine readable medium storing thereon an authentication program, a certificate photograph taking apparatus, and a certificate photograph taking method. The above object can be achieved by combinations described in the independent claims. The dependent claims define further advantageous and exemplary combinations of the present invention.

In order to overcome the above drawbacks, according to a first aspect of the present invention, an authentication system, which executes authentication of a user, is provided, wherein the authentication system includes a first image pickup unit for picking up a face image of the user, a second image pickup unit for picking up a face image of the user from a direction different from that of the first image pickup unit, a direction calculation unit for acquiring a direction to which the user's face turns on the basis of the face images picked up by the first and second image pickup units, and a selection unit for selecting at least one of the face images picked up by the first and second image pickup units on the basis of the direction to which the user's face turns. The authentication system may further include an authentication unit for executing the authentication of the user making use of the face image selected by the selection unit.

The authentication system may further include a lighting control unit for controlling the direction, in which lighting apparatus illuminates the user's face, based on the direction to which the user's face turns. In case of the direction in which the lighting apparatus illuminates having been controlled, each of the first and second image pickup units may pick up a face image of the user again and the selection unit may select at least one of the face images which are picked up again by the first and second image pickup units. The lighting control unit may control lighting condition of each of a plurality of lighting apparatus which illuminate the user's face in different directions on the basis of the direction to which the user's face turns. The lighting control unit may control the direction in which the lighting apparatus illuminates the user's face so that the direction makes the user distinguishable from other persons more easily on the basis of the face image selected by the selection unit.

The authentication system may further include a storage unit for storing a plurality of face images. The authentication unit may authenticate the user in case that at least a part of the plurality of face images include a face image showing similarity of which value is higher than a predetermined reference value to the face image selected by the selection unit when the face image selected by the selection unit is compared with at least a part of the plurality of face images. The lighting control unit may control the direction in which the lighting apparatus illuminate the user's face so that the direction is to be substantially the same with the direction in which the lighting apparatus illuminate the face of the subject when at least a part of the plurality of the face images are picked up.

The lighting control unit may control the lighting apparatus to illuminate the user's face in a uniform direction, in case that both the first and second image pickup units pick up the face images which are used when the direction to which the user's face turns is acquired by the direction calculation unit. The lighting control unit may further control the direction to which an infrared ray emitted from the lighting apparatus illuminates the user's face on the basis of the direction to which the user's face turns, and both the first and second image pickup units may further pick up the user's face image in the range of infrared lay in case that the direction in which the infrared ray illuminates the user's face is controlled by the lighting control unit.

A storage unit, which stores the face image selected by the selection unit with correspondent to the direction to which the user's face turns, may further be provided. In case that the direction to which the user's face turns is the direction from the user to one of the first and second image pickup units, the selection unit may select the face image picked up by the other. The second image pickup unit may be located so that the angular difference in the horizontal direction between the image pickup directions of the first and the second pickup units is substantially 15° or 30°. The selection unit may select the face images picked up by both the first and the second image pickup units in case that the direction to which the user's face turns is the direction from the user to neither the first image pickup unit nor the second image pickup unit.

The second image pickup unit may be located so that the angular difference in the horizontal direction between the image pickup directions of the first and the second pickup units is substantially 24°. The second image pickup unit may be located so that the angular difference in the vertical direction between the image pickup directions of the first and the second pickup units is between substantially 10° and 20°. The direction calculation unit may generate the direction to which the user's face turns as the direction from the user to the first or the second image pickup unit by deciding whether, for each of the face images picked up by the first and the second image pickup units, the face image is picked up from the front or not. The direction calculation unit may acquire the direction to which the user's face turns on the basis of the parallax between the face images picked up by the first and the second image pickup units.

The direction calculation unit includes a first direction calculation unit for acquiring the direction to which the user's face turns viewed from the first image pickup unit, on the basis of the face image picked up by the first image pickup unit, and a second direction calculation unit for acquiring the direction to which the user's face turns viewed from the second image pickup unit, on the basis of the face image picked up by the second image pickup unit. The authentication system may further include a decision unit for deciding whether each of the face images picked up by the first and the second image pickup units is normal or not by comparing the difference between the image pickup directions of the first and the second image pickup units with the difference between the directions to which the user's face turns acquired by the first and the second direction calculation units. The direction calculation unit may further include a correction unit for correcting each of the directions acquired by the first and the second direction calculation units on the basis of the difference between the image pickup directions of the first and the second image pickup units.

Further, according to a second aspect of the present invention, an authentication system, which includes an image pickup unit for picking up a face image of a user from a direction different from the front, a three-dimensional shape acquisition unit for acquiring information on a three-dimensional shape of the user's face from an image picked up by the image pickup unit making use of the vertical symmetry of the face, and an authentication unit for executing authentication of the user on the basis of the information on the three-dimensional shape of the user's face, is provided.

Moreover, according to a third aspect of the present invention, an authentication method for executing authentication of a user includes a first image pickup step of picking up a face image of the user, a second image pickup step of picking up a face image of the user from a direction different from the direction of image pickup in the first image pickup step, a direction calculating step of acquiring the direction to which the user's face turns on the basis of the face images picked up during the first and the second image pickup steps, and a selection step of selecting at least one of the images picked up during the first and the second image pickup steps on the basis of the direction to which the user's face turns.

Furthermore, according to a fourth aspect of the present invention, a machine readable medium storing thereon a program, which makes a computer perform functions of an authentication system for executing authentication of a user, is provided, wherein the authentication system includes a first image pickup unit for picking up a face image of the user, a second image pickup unit for picking up a face image of the user from a direction different from the direction of image pickup by the first image pickup unit, a direction calculation unit for acquiring the direction to which the user's face turns on the basis of the face images picked up by the first and the second image pickup units, and a selection unit for selecting at least one of the images picked up by the first and the second image pickup units on the basis of the direction to which the user's face turns.

Furthermore, according to a fifth aspect of the present invention, a certificate photograph taking apparatus includes an image pickup unit for picking up a face image of a user, a direction instruction unit for instructing the user to turn to the direction which is different from the direction from the user to the image pickup unit by a predetermined angle, and an issuance unit for printing out and issuing the face image picked up by the image pickup unit. The issuance unit records the face image, picked up by the image pickup unit on an IC chip provided in an IC card. The certificate photograph taking apparatus may further include a second image pickup unit for picking up a face image of the user from a direction different from the direction of the first image pickup unit, and the issuance unit may further print out the face image picked up by the second image pickup unit on the surface of the IC card and issue the IC card. The second image pickup unit may be located where a face image of the user is picked up from the front of the user.

The image pickup unit may not pick up a face image of the user when a decision is made that the user's face is not within a predetermined range for a face image to be picked up. The image pickup unit may not pick up a face image of the user in case that the head of the user does not contact the headrest of the chair on which the user sits. A direction instruction unit may instruct the user to turn to the direction which is different from the direction from the user to the image pickup unit by substantially 15° or 30° in the horizontal direction.

The direction instruction unit may instruct the user to turn to the direction different from the user to the image pickup unit upwardly by substantially 10° to 20°. The direction instruction unit may be a mirror placed so as to turn to the user in a direction different from the direction from the user to the image pickup unit. The direction instruction unit may be a chair placed so as to turn to a direction different from the direction from the user to the image pickup unit.

The certificate photograph taking apparatus may have the internal space of which a boundary line between the walls is not included in the face image picked up by the image pickup unit. The internal space may have a wall integrally formed by a smooth curved surface connecting the wall at the back of the user and one of the walls on the right and left of the user, at least a part of which is included in the face image picked up by the image pickup unit. The internal space may have a rear wall not parallel with the direction which the direction instruction unit instructs the user to turn to, and the image pickup unit may be placed in the direction vertical to the rear wall to face the place of the user.

At least a part of the internal space may have a horizontal cross section of a trapezoid shape, the wall of the internal space, which contacts with at least one of the bottom edges of the trapezoid, may include an entrance, and the wall, which contacts with at least one of the side edges of the trapezoid, may form an acute angle respect to the wall which contacts with at least one side of the bottom edges of the trapezoid. The image pickup unit may turn to the direction vertical to the wall, which contacts with at least one side of the bottom edges of the trapezoid. At least a part of the internal space may have a horizontal cross section of a trapezoid shape, the wall of the internal space, which contacts with at least one of the bottom edges of the trapezoid, may include an entrance, and the wall, which contacts with at least one of the side edges of the trapezoid, may be formed with an acute angle respect to the wall which contacts with at least one side of the bottom edges of the trapezoid. The direction instruction unit may instruct the user to turn to the direction vertical to the wall which contacts at least one of the side edges. The rear wall may emit light spontaneously.

Furthermore, according to a sixth aspect of the present invention, a certificate photograph taking method includes a direction instruction step of instructing a user to turn to the direction which is different from the direction from the user to an image pickup unit by a predetermined angle, an image pickup step of picking up a face image of the user, and an issuance step for printing out and issuing the face image picked up during the image pickup step.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
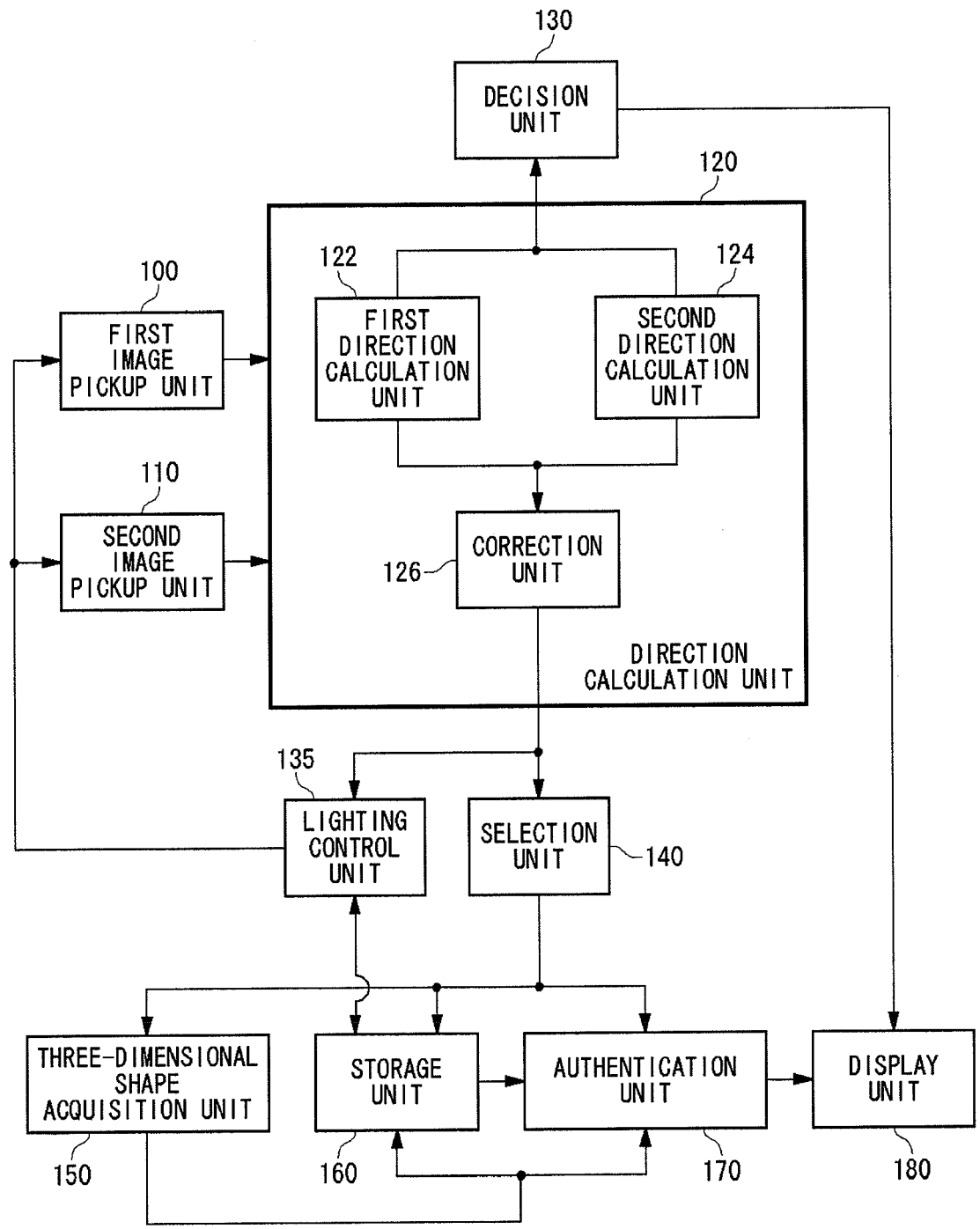
FIG. 1 is a block diagram showing an example of the configuration of an authentication system 10 according to a first embodiment of the present invention.

FIG. 1 is a block diagram showing an example of the configuration of an authentication system 10 according to a first embodiment of the present invention. The authentication system 10 according to the first embodiment of the present invention executes individual authentication making use of a face image of a user. The authentication system 10 is installed at the entrance of an apartment house and executes authentication to determine whether the user is a resident of the apartment house. In this case, the authentication system 10 picks up a face image of the user, compares the picked-up face image with a plurality of face images stored in a face image database of the residence of the apartment house, and only if the picked-up face image accords with one of the plurality of face images of the residence, the user's admission is permitted. The authentication system 10 may use an image including information on a three-dimensional shape of a face as the face image used for authentication.

An object of the authentication system 10 according to the present embodiment is to clearly pick up a face image of a user whose face turns to a direction different from the front and to execute individual authentication more precisely by using the face image.

The authentication system 10 according to the present embodiment performs two operations, one is to store the picked-up face image to execute authentication later, and the other is to authenticate the user by comparing the face image with a face images which have been formerly picked up and stored.

The authentication system 10 includes a first image pickup unit 100, a second image pickup unit 110, a direction calculation unit 120, a decision unit 130, a lighting control unit 135, a selection unit 140, a three-dimensional shape acquisition unit 150, a storage unit 160, an authentication unit 170, and a display unit 180. The first image pickup unit 100 picks up a face image of the user and outputs data of the picked-up image to the direction calculation unit 120. The first image pickup unit 100 may be, for example, a digital still camera for picking up still pictures or a digital video camera for picking up moving pictures. If the first image pickup unit is a digital video camera, the first image pickup unit may output an arbitrary frame of a moving picture to the direction calculation unit 120. The second image pickup unit 110 picks up a face image of the user from a direction different from the first image pickup unit 100, and outputs data of the picked-up image to the direction calculation unit 120.

The direction calculation unit 120 acquires the direction to which the user's face turns on the basis of the face images picked up by the first image pickup unit 100 and the second image pickup unit 110. The direction acquired by the direction calculation unit 120 may be, for example, an absolute direction which is an angular difference from a predetermined reference direction or a relative direction which is an angular difference from the image pickup direction of each of the first image pickup unit 110 and the second image pickup unit 110. Then, the direction calculation unit 120 outputs the information on the acquired direction and the face images picked up by the first image pickup unit 100 and the second image pickup unit 120 to the selection unit 140. In case that the direction calculation unit 120 acquires the relative direction with respect to each of the first image pickup unit 100 and the second image pickup unit 110, the direction calculation unit 120 outputs information on the acquired direction in association with each face image.

The direction calculation unit 120 includes a first direction calculation unit 122, a second direction calculation unit 124, and a correction unit 126. The first direction calculation unit 122 acquires the direction viewed from the first image pickup unit 100, which the user's face turns to, on the basis of the face image picked up by the first image pickup unit 100 and outputs information on the acquired direction to the correction unit 126 and the decision unit 130. The second direction calculation unit 124 acquires the direction viewed from the second image pickup unit 110, which the user's face turns to, on the basis of the face image picked up by the second image pickup unit 110 and outputs information on the acquired direction to the correction unit 126 and the decision unit 130. The correction unit 126 corrects each of the direction acquired by the first direction calculation unit 122 and the direction acquired by the second direction calculation unit 124 on the basis of the difference between the image pickup directions of the first image pickup unit 100 and the second image pickup unit 110. Then, the correction unit 126 outputs information on each corrected direction to the lighting control unit 135 and the selection unit 140.

The decision unit 130 decides whether the face images, which are picked up by the first image pickup unit 100 and the second image pickup unit 110, are normal by comparing the difference between the image pickup directions of the first image pickup unit 100 and the second image pickup unit 110 with the difference between the directions, which the user's face turns to, acquired by the first direction calculation unit 122 and the second direction calculation unit 124. Then, the decision unit 130 outputs the decision result to the display unit 180.

The lighting control unit 135 controls the direction in which the lighting apparatus installed in the authentication system 10 illuminates the user's face on the basis of the direction, which the user's face turns to, acquired by the direction calculation unit 120. Then, the lighting control unit 135 notifies the first image pickup unit 100 and the second image pickup unit 110 of controlling the direction in which the lighting apparatus illuminates the user's face. Then, each of the first image pickup unit 100 and the second image pickup unit 110 picks up a face image of the user again and outputs the picked-up face image to the selection unit 140 through the direction calculation unit 120 in case that the direction in which the lighting apparatus illuminates the user's face is controlled by the lighting control unit 135.

The selection unit 140 selects at least one of the images picked up by the first image pickup unit 100 and the second image pickup unit 110 on the basis of the direction, which the user's face turns to, acquired by the direction calculation unit 120. Specifically, the selection unit 140 selects at least an image in which the user's face does not turn to the front, of the images picked up by the first image pickup unit 100 and the second image pickup unit 110. Here, in case that the direction in which the lighting apparatus illuminates the user's face is controlled by the lighting control unit 135 and the face image of the user is picked up again by the first image pickup unit 100 and the second image pickup unit 110, the selection unit 140 may select at least one of the face images picked up again. Then, the selection unit 140 outputs the image information on the selected image to the three-dimensional shape acquisition unit 150, a storage unit 160, and an authentication unit 170.

By making use of the vertical symmetry of the user's face, the three-dimensional shape acquisition unit 150 acquires information on a three-dimensional shape of the user's face from the face image selected by the selection unit 140 in which the user's face does not turn to the front. Specifically, the three-dimensional shape acquisition unit 150 generates the image, which is made by vertically reversing the selected face image, as a face image picked up from a symmetric position of the image pickup position of the selected face image with respect to the center surface of the vertical symmetry of the user's face. Successively, the three-dimensional shape acquisition unit 150 acquires information on a three-dimensional shape of the user's face making use of a parallax between the selected face image and the reversed face image by a conventional method. Then, the three-dimensional shape acquisition unit 150 outputs the acquired information on the three-dimensional shape of the user's face to the storage unit 160 and the authentication unit 170.

The storage unit is a database for storing a plurality of face images which are to be compared with the picked-up face images in the authentication process and stores the face images selected by the selection unit 140 in association with the directions of the user's face acquired by the direction calculation unit 120. In case that, for example, the authentication system 10 is an authentication system for executing individual authentication which is installed at the entrance of an apartment house, the storage unit 160 may store a face image which was picked up when a residence moved into the apartments house. In case that the direction acquired by the direction calculation unit 120 is an absolute direction, the storage unit 160 may store the face images further in association with the absolute image pickup directions in which the face images are picked up. Further, the storage unit 160 may store information for identifying the user, which is input by the user or an operator of the authentication system 10 making use of an input means not shown in the figure, in association with the face image. Further, the storage unit 160 stores information on a three-dimensional shape of the user's face, which is acquired by the three-dimensional shape acquisition unit 150.

The authentication unit 170 executes authentication of the user making use of the face image selected by the selection unit 140. Specifically, the authentication unit 170 executes the authentication of the user by comparing the selected face image with the face images which have been formerly picked-up and stored in the storage unit 160 or the information on the three-dimensional shape of the user's face which has been formerly acquired and stored in the storage unit 160. More specifically, the authentication unit 170 compares the face image selected by the selection unit 140 with at least a part of the plurality of face images stored in the storage unit 160, and authenticates the user if a face image showing similarity of which value is higher than a predetermined reference value to the selected face image is included in the concerned at least a part of the plurality of face images. Further, the authentication unit 170 may execute the authentication of the user by comparing the information on the three-dimensional shape of the user's face which is acquired by the three-dimensional shape acquisition unit 150 with the face images which have been formerly picked up and stored in the storage unit 160 or the information on the three-dimensional shape which has been formerly acquired and stored in the storage unit 160.

The display unit 180 is a display device prepared in the terminal, which the operator of the authentication system 10 operates, displays and notifies the user of the decision result of the decision unit 130 and the authentication result of the authentication unit 170.

According to the authentication system 10 according to the present embodiment, it is possible to clearly pick up a face image of the user whose face turns to an oblique direction by using two image pickup means which are different in the image pickup direction, i.e. the first image pickup unit 100 and the second image pickup unit 110. Further, by using the face image of the user whose face turns to the oblique direction for the authentication, it is possible to execute individual authentication more precisely in comparison with the case of using the face image of the user whose face turns to the front. In addition, according to the authentication system 10 according to the present embodiment, it is possible to acquire a three-dimensional shape of the user's face by using two image pickup means which are different in the image pickup direction, i.e. the first image pickup unit 100 and the second image pickup unit 110. Thus, it is possible to execute individual authentication more precisely on the basis of the three-dimensional shape.

Further, according to the authentication system 10 according to the present embodiment, it is possible to control the direction of illuminating the user's face by the lighting apparatus on the basis of the direction to which the user's face turns. Thus, as it is possible to illuminate the user's face from a constant direction, regardless of the direction to which the user's face turns, the authentication of the user can be precisely executed at any time.

The configuration of the authentication system 10 according to the first embodiment of the present invention is not limited to the configuration illustrated in the present figure and many changes may be added to the configuration illustrated in the present figure. For example, the authentication system 10 may not include the decision unit 130. Further, for example, the authentication system 10 may not include the three-dimensional shape acquisition unit 150. Furthermore, for example, the storage unit 160 may store face images acquired through a recording medium or network instead of the face images picked up by the first image pickup unit 100 and the second image pickup unit 110. Furthermore, for example, the authentication system 10 may notify an operator of the authentication result and the like making use of another means which substitutes for the display unit 180, and perform another operation, for example, of opening and closing the door on the basis of the authentication result.

Figure 2:
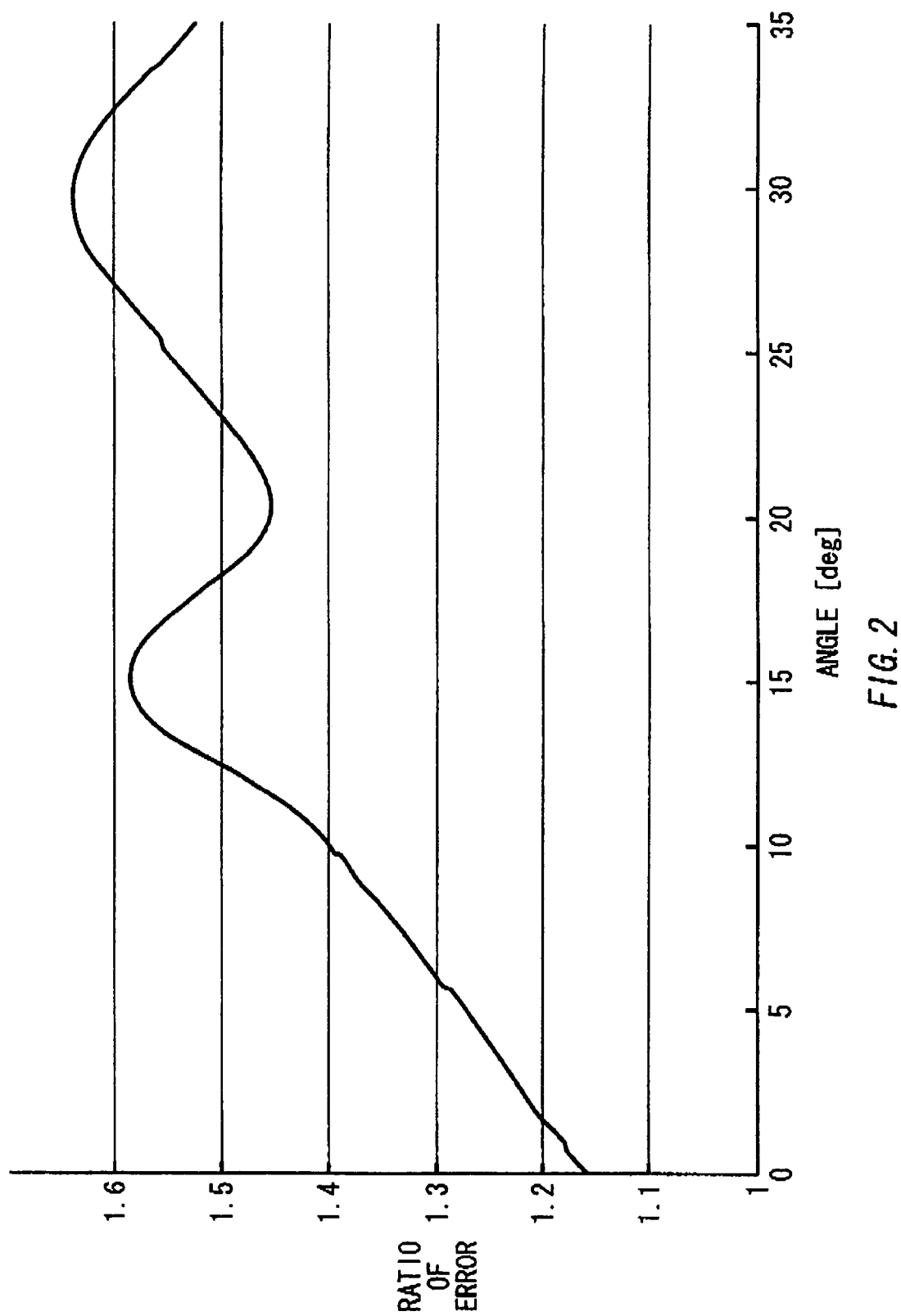
FIG. 2 shows easiness of authentication while the projection direction of a two-dimensional image is sequentially changed in the horizontal direction.
Figure 3:
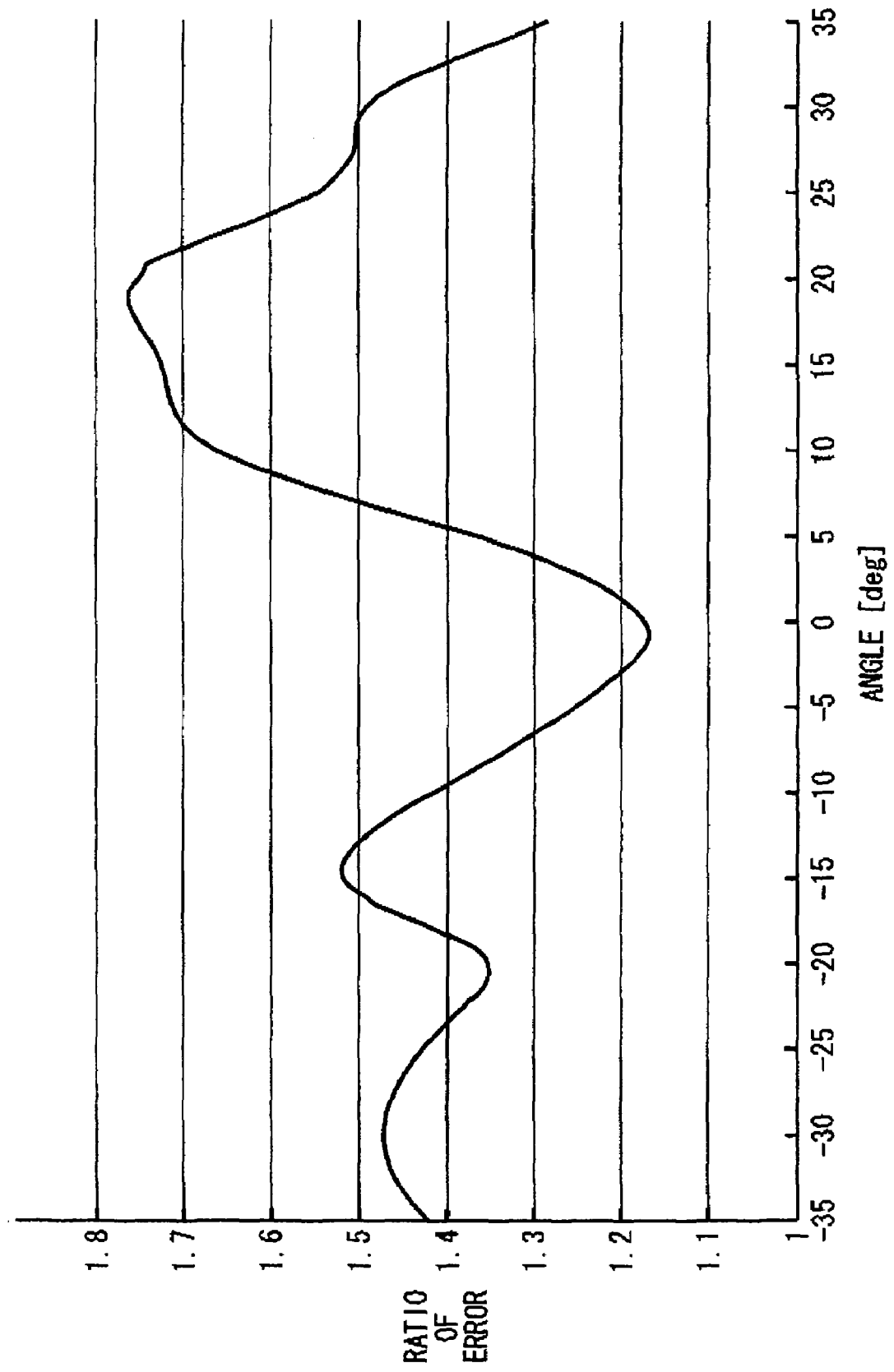
FIG. 3 shows easiness of authentication while the projection direction of a two-dimensional image is sequentially changed in the vertical direction.

With reference to FIGS. 2 and 3, in case of executing individual authentication making use of a face image, a direction of a face, which makes identification of a person the easiest, will be explained in the following. In the following explanation, in case of comparing two-dimensional face images picked up from variable directions with a three-dimensional template showing three-dimensional positions of feature points in the face, a face image is extracted, which is recognized to have the most difference between a comparison result by the three-dimensional template of a person who is the subject of the face images and a comparison result by a three-dimensional template of another person. Then, the direction to which the face of the subject turns in the extracted face image is obtained as a direction of a face which makes individual authentication executed most easily.

First, a three-dimensional model is generated for each of a plurality of persons, by obtaining a wire frame model, which shows a three-dimensional shape of the person's face, using a range finder and the like and mapping a face image of the person, which is picked up separately, into a wire frame model. In succession, for the generated three-dimensional model, a plurality of feature points, which show remarkable differences for each person, are extracted. In succession, a three-dimensional template is generated by extracting only the feature points from each three-dimensional model. In succession, as a two-dimensional image of a person to be authenticated, an image, which is generated by picking up the three-dimensional model of the person from a plurality of directions, is obtained. Thus, it is possible to obtain a face image of the image pickup direction is more strictly controlled, in comparison with the case of separately picking up face images from a plurality of directions. Successively, a plurality of feature points of the two-dimensional image are extracted.

Successively, a distance between a group of the positions of the feature points in the projection plane in case of projecting a three-dimensional template of each person on a plane and a group of the positions of the feature points in the two-dimensional image is detected as a recognizable error. Then, the error is being detected varying the direction of projecting the three-dimensional template sequentially, and the least error is detected for each person. Conventionally, an error in the case of using other person's three-dimensional template is output as a higher value than an error in the case of using a person's three-dimensional template corresponding a two-dimensional image, with correspondent to the magnitude of the difference among the positions of the feature points for each person. However, sometimes, the differences among the three-dimensional positions of the feature points of each person are not reflected sufficiently to the two-dimensional image according to the projecting directions of the two-dimensional image like the case of projecting from the front. In this case, even though any person's three-dimensional template is used, large differences are not detected. Here, the rate of the minimum of the errors in case of using a three-dimensional template of a person, who is different from the person corresponding to the two-dimensional image, and an error in case of using a three-dimensional template of the person corresponding to the two-dimensional image is generated as an index showing easiness of identification. Generally, the calculated rate is larger than one, and the larger the rate is, the easier the identification is.

FIG. 2 shows an example of variation of easiness of authentication while the projecting direction of a two-dimensional image is sequentially changed in the horizontal direction. In the present figure, the axis of abscissa shows inclination of the face when the front is defined as zero degree, in other words, the projecting direction in case of generating a two-dimensional face image. Further, the axis of ordinate shows the rate of error calculated for each direction of the face. As clear from the present figure, when the inclination of the face is 15° and 30°, the rate indicates the largest value. Consequently, when the user's face turns to the direction inclined by 15° or 30° in the horizontal direction with respect to the front, the individual authentication can be executed most easily. Further, when the inclination of the face is within the range from 12° to 35°, the rate is relatively high. Consequently, by using the face image in which the user's face turns to the direction inclined within the range from 12° to 35° in the horizontal direction with respect to the front, the individual authentication can be executed more easily.

FIG. 3 shows an example of variation of easiness of authentication while the projecting direction of a two-dimensional image is sequentially changed in the vertical direction. In the present figure, the axis of abscissa shows inclination of the face when the front is defined as zero degree, in other words, the projecting direction in case of generating a two-dimensional face image. Here, if the face's inclination of a positive number shows that the three-dimensional model is projected from the below. As clear from the present figure, when the direction of the face is within the range from 10° to 20°, the rate is relatively high. Consequently, by using the face image in which the user's face turns to the direction inclined within the range from 10° to 20° upwardly with respect to the front, the individual authentication can be executed easily.

According to the above descriptions, in case of executing the individual authentication on the basis of the positions of the feature points showing of characteristics a face's three-dimensional shape, it is possible to execute the individual authentication easily by using the face image in which the user's face turns to the direction above mentioned or the direction within the range above mentioned. In other words, it is possible to discriminate a person from other persons more precisely by using the face image in which the user's face turns to such directions. In addition, the easiness of the authentication in case of comparing a two-dimensional image with a three-dimensional template is shown in the above. However, it is no wonder that the authentication can be executed precisely by using face images in which the user's face turns to the same direction, also in case of comparing the positions of feature points between two two-dimensional images picked up from substantially same directions.

Figure 4:
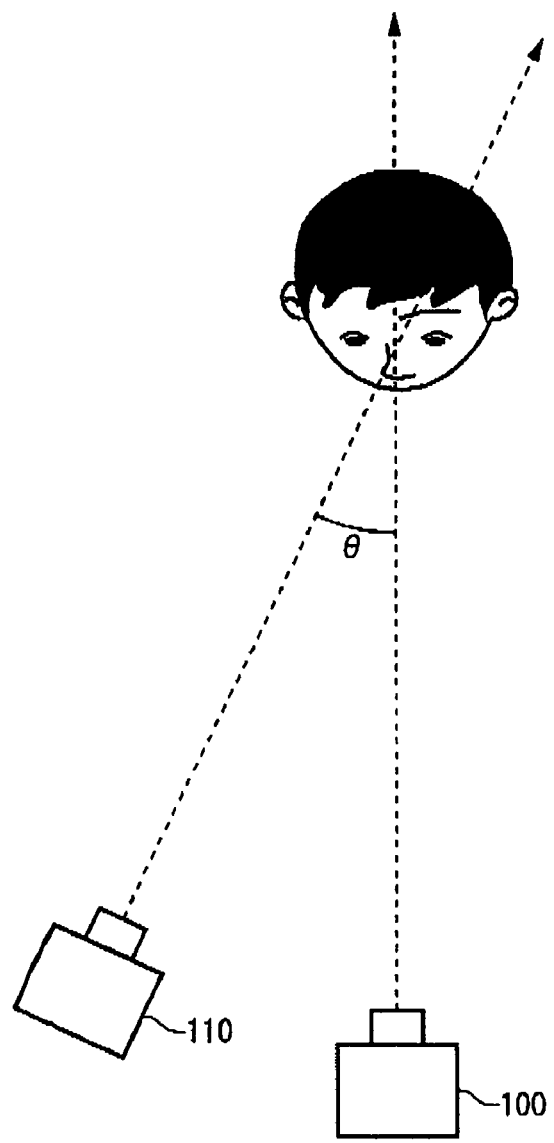
FIG. 4 shows an example of relationship between the image pickup directions of a first image pickup unit 100 and a second image pickup unit 110 according to the first embodiment of the present invention.

FIG. 4 shows an example of an example of relationship between the image pickup directions of the first image pickup unit 100 and the second image pickup unit 110 according to the first embodiment of the present invention. According to the present example, the difference in the horizontal direction between the image pickup direction of the first image pickup unit 100, that is an optical axis, and the image pickup direction of the second image pickup unit 110 is shown as an angle θ and there is a user at the intersection of the optical axis. As explained with reference to FIG. 2, the face image by which the individual authentication can be performed most precisely is the face image in which a subject turns to a direction inclined by substantially 15° or 30° in the horizontal direction with respect to the front. Accordingly, according to the present example, the second image pickup unit 110 is formed so that the angle θ is substantially 15° or 30°.

According to the present example, the calculation of a direction to which user's face turns by the direction calculation unit 120 and the selection process of the picked-up image by the selection unit 140 are explained below. First, the calculation process of the direction to which the user's face turns by the first direction calculation unit 122 and the second direction calculation unit 124 is explained. The first direction calculation unit 122 extracts a plurality of the feature point from the face image picked up by the first image pickup unit 100, for example, eyes, a nose, ears, by using a well-known method. The first direction calculation unit 122 extracts the same feature point from the standard three-dimensional model of the human face. Accordingly, the first direction calculation unit 122 generates a plurality of the projected images by making the three-dimensional model rotate at various angles and compares a set of positions of the feature point in each projected image with a set of positions of the previously extracted feature point in the image picked up by the first image pickup unit 100. Hence, the first direction calculation unit 122 acquires the projection direction in the projected image, of which the distance between each feature point is the shortest, as the projection direction of the face image picked up by the first image pickup unit 100 and acquires a direction to which the user's face turns viewed from the first image pickup unit 100. Moreover, the second direction calculation unit 124 acquires a direction to which the user turns viewed from the second image pickup unit 110.

Accordingly, the correction unit 126 acquires an angle difference of the acquired direction between the first direction calculation unit 122 and the second direction calculation unit 124, and calculates a difference between the calculated angle difference and the angle difference of the image pickup direction between the first image pickup unit 100 and the second image pickup unit 110. Therefore, the correction unit 126 corrects each calculated direction by adjusting the half of the calculated difference to the directions acquired by the first direction calculation unit 122 and the second direction calculation unit 124 respectively in order that the angle difference of the acquired direction between the first direction calculation unit 122 and the second direction calculation unit 124 respectively is substantially the same as that of the image pickup direction between the first image pickup unit 100 and the second image pickup unit 110. For example, the angle of the directions calculated by the first direction calculation unit 122 and the second calculating unit 124 are 3° and 27°. Here, the calculated directions are the angle differences in case that a direction directly facing the user is 0°. Accordingly, for example, in case that an angle θ is 30°, the correction unit 126 calculates 6° by subtracting 24°, the difference between 27° calculated by the second direction calculation unit 124 and 3° calculated by the first direction calculation unit 122 from 30°, the angle θ. Hence, the correction unit 126 corrects each direction according to making 30° by adding 3° to 27° calculated by the second direction calculation unit 124 accompanying with making 0° by subtracting 3°, a half-angle of 6°, from 3° calculated by the first direction calculation unit 122. According to this, even if in case that the errors are caused in calculation of the directions to which the face of the user turns by the first direction calculation unit 122 and the second direction calculation unit 124, it is possible to output the results with high accuracy.

According to the direction calculation unit 120, the calculation method of the direction to which the user's face turns is not restricted within the above method and another method may be used. For example, the direction calculation unit 120 may acquire the direction to which the user's face turns as a direction from the user to either the first image pickup unit 100 or the second image pickup unit 110 by determining whether or not each face image is picked up from the front of the user with regard to the face images picked up by the first image pickup unit 100 and the second image pickup unit 110. In detail, the direction calculation unit 120 detects a center position of each face image picked up by the first image pickup unit 100 and the second image unit 110. Accordingly, the direction calculation unit 120 determines whether or not the face image is picked up from the front of the user by determining whether or not there is a line to which the face image shows the line symmetry among lines passing through the center. Here, the direction calculation unit 120 inverts a part image of the face image divided by the line in the vertical direction to the line and compares the inverted image with the other part image. For example, in case that the conformity of the pixel is above the predetermined reference value, the direction calculation unit 120 may determine that the face image shows the line symmetry with respect to the line. According to this, it is possible to acquire the direction easily to which the user's face turns without performing the calculation of the projection direction by using the three dimensional model.

Moreover, another method may be used as a calculation method of a direction to which the user's face turns. For example, the direction calculation unit 120 may acquire the direction to which the user's face turns on a basis of the parallax of the face images picked up by the first image pickup unit 100 and the second image pickup unit 110. In detail, the direction calculation unit 120 extracts more than three feature points not being placed on the same surface with regard to each picked-up image and acquires the direction to which the user's face turns on a basis of the position of the feature point and the angle θ of each image by means of a well-known method. According to this, it is possible to acquire the direction to which the user's face turns with high accuracy.

Accordingly, in case that the direction acquired by the direction calculation unit 120, to which the user's face turns, is a direction from the user to either the first image pick up unit 100 or the second image pickup unit 110, the selection unit 140 selects a face image picked up by the other image pickup unit. In this case, the direction, to which the user's face turns, of the face image picked up by the other image pickup unit is the same as the angle θ. According to this, in case that the angle θ is substantially 15° or 30°, it is possible to perform the individual authentication with higher accuracy.

On the other hand, in case that the direction acquired by the direction calculation unit 120, to which the user's face turns, is not a direction from the user to either the first image pickup unit 100 or the second image pickup unit 110, the selection unit 140 selects the face image picked up by both the first image pickup unit 100 and the second image pickup unit 110. According to this, even if the face direction of the face image is not the most appropriate, it is possible to perform the individual authentication with high accuracy by using a plurality of images.

According to the present example, the angle θ is substantially 15° or 30°, instead of this, it may be an angle showing higher error ratio than another angle among angles between 12° and 36° in FIG. 2. In case that the direction to which the user's face turns is a direction from the user to either the first image pickup unit 100 or the second image pickup unit 110, it is possible to perform the individual authentication with high accuracy by selecting the face image picked up by the other.

Moreover, although according to the present example, the angle θ is a difference of the image pickup direction in the horizontal direction between the first image pickup unit 100 and the second image pickup unit 110, the angle θ may be a difference in the vertical direction. Here, as explained with reference to FIG. 3, the face image by which the individual authentication can be performed with the highest accuracy is the face image turning to the direction of which a subject is inclined upwardly at an angle substantially between 10° and 20° with respect to the front. Accordingly, in this case, it is possible to perform the individual authentication with high accuracy by making the angle θ be an angle substantially between 10° and 20° in the vertical direction and selecting the face image picked up by the other in case that the user's face turns to a direction facing a image pickup unit installed in the upper part between the first image pickup unit 100 and the second image pickup unit 110. In detail, the first image pickup unit 100 may be installed at substantially the same height as that of the user's face in order to face directly in case that the user turns to the horizontal direction. In addition, the second image pickup unit 110 may be installed in a lower position than that of the user's face in order to pick up the image in a direction inclined at an angle substantially between 10° and 20° upwardly with respect to the horizontal direction. According to this, in case that the user's face turns to the front in the face image picked up by the first image pickup unit 100, it is possible to perform the individual authentication with high accuracy by selecting the face image picked up by the second image pickup unit 110. Here, the direction calculation unit 120 may use the calculation methods of the face direction to use the three-dimensional model and the parallax in the picked-up image.

Moreover, the image pick up directions of the first image pickup unit 100 and the second image pickup unit 110 do not need to have the angle differences in either horizontal direction or vertical direction, and may have a variety of the angle differences, for example, the second image pickup unit 110 is installed on an obliquely downward position of the first image pickup unit 100. Even if, in this case, the authentication system 10 selects the face image in which the face of the user turns to a different direction from the front and can perform the individual authentication with high accuracy.

Figure 5:
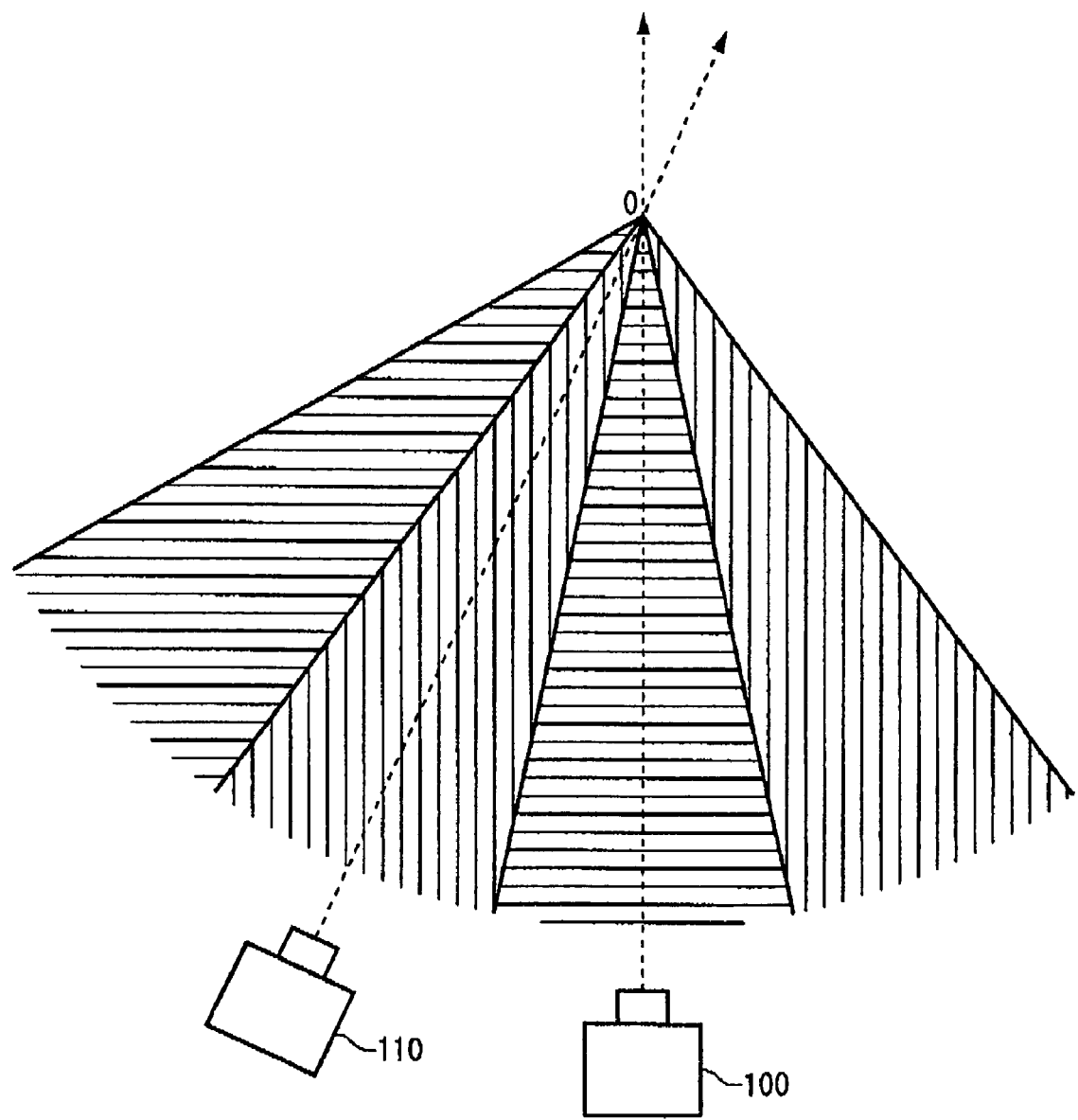
FIG. 5 shows another example of relationship between the image pickup directions of a first image pickup unit 100 and a second image pickup unit 110 according to the first embodiment of the present invention.

FIG. 5 shows another example of relationship between the image pickup directions of the first image pickup unit 100 and the second image pickup unit 110 according to the first embodiment of the present invention. According to the present example, the second image pickup unit 110 is installed in order that the difference between the image pickup direction of the first image pickup unit 100, the optical axis and the image pickup direction of the second image pickup unit 110 in the horizontal direction is 24°. In addition, the user is at the intersection O of the optical axis. According to FIG. 2, it is possible to perform the individual authentication with higher accuracy in case of using the face image turning to a direction inclined at an angle substantially between 12° and 35° in the horizontal direction with respect to the front. Accordingly, since it is possible to perform the individual authentication with high accuracy, the first image pickup unit 100 and the second image pickup unit 110 need to pick up the face image in which the user's face turns to a direction inclined at an angle substantially between 12° and 36° in the horizontal direction with respect to the front.

According to the present example, the user's face at the point O needs to turn to a direction of the range with vertical stripes in order that the first image pickup unit 100 picks up the face image by which the individual authentication can be performed with high accuracy. In this case, as obvious from FIG. 5, in a range of 12° of in the right and left around the direction in which the first image pickup unit 100 directly faces the user, the first image pickup unit 100 cannot pick up the face image by which it is possible to perform the individual authentication with high accuracy. On the other hand, the user's face at the point O needs to face a direction of the range with horizontal stripes in order that the second image pickup unit 110 picks up the face image by which the individual authentication can be performed with high accuracy. As in this case, in a range of 12° of right and left around the direction in which the second image pickup unit 110 directly faces the user, the second image pickup unit 110 cannot pick up the face image by which the individual authentication can be performed with high accuracy.

However, by installing the second image pickup unit 110 in order that the angle difference of the image pickup direction in the horizontal direction between the first image pickup unit 100 and the second image pickup unit 110 is 24°, it is impossible to pick up the face image by which the individual authentication can be performed with high accuracy and it is possible to complement mutually the range of 12° of right and left around the direction facing the user directly. According to this, it is possible to acquire the range of the direction to which the user's face turns, in which the face image to make the individual authentication be performed with high accuracy can be picked up, be a continuous wider range.

Accordingly, the selection unit 140 selects the face image wherein the direction to which the user's face turns is more appropriate for the individual authentication, that is, the direction in which the error ratio in FIG. 2 is higher between the face images picked up by the first image pickup unit 100 and the second image pickup unit. Instead of this, the selection unit 140 may select both the face images picked up by the first image pickup unit 100 and the second image pickup unit 110. According to this, although the process for the authentication increases compared with the case of selecting one between the face images, it is possible to perform the individual authentication with high accuracy.

According to the authentication system 10 in the present embodiment, although it is difficult to specify previously the direction, to which the user's face turns, in a narrow range, for example, such as the individual authentication to the walking user, in case that it is possible to specify the direction within the specific range, even if the user turns to whatever direction within the range, it is possible to pick up the face image by which the individual authentication can be performed with high accuracy.

Although according to the present example, there is an angle difference of the image pickup direction in the horizontal direction between the first image pickup unit 100 and the second image pickup unit 110, instead of this, there may be an angle difference in the vertical direction. According to FIG. 3, in case of using the face image in which the subject turns to a direction inclined at an angle substantially between 10° and 20° upwardly with respect to the front, it is possible to perform the individual authentication with high accuracy. Accordingly, it is possible to acquire the range of the direction to which the user turns and in which it is possible to pick up the face image to make the individual authentication performed with high accuracy, being a continuous wider range by installing the second image pickup unit 110 in order that the angle difference in the vertical direction between the image pickup direction of the first image pickup unit 100, that is, the optical axis and the image pickup direction of the second image pickup unit 110 is 10°.

Figure 6:
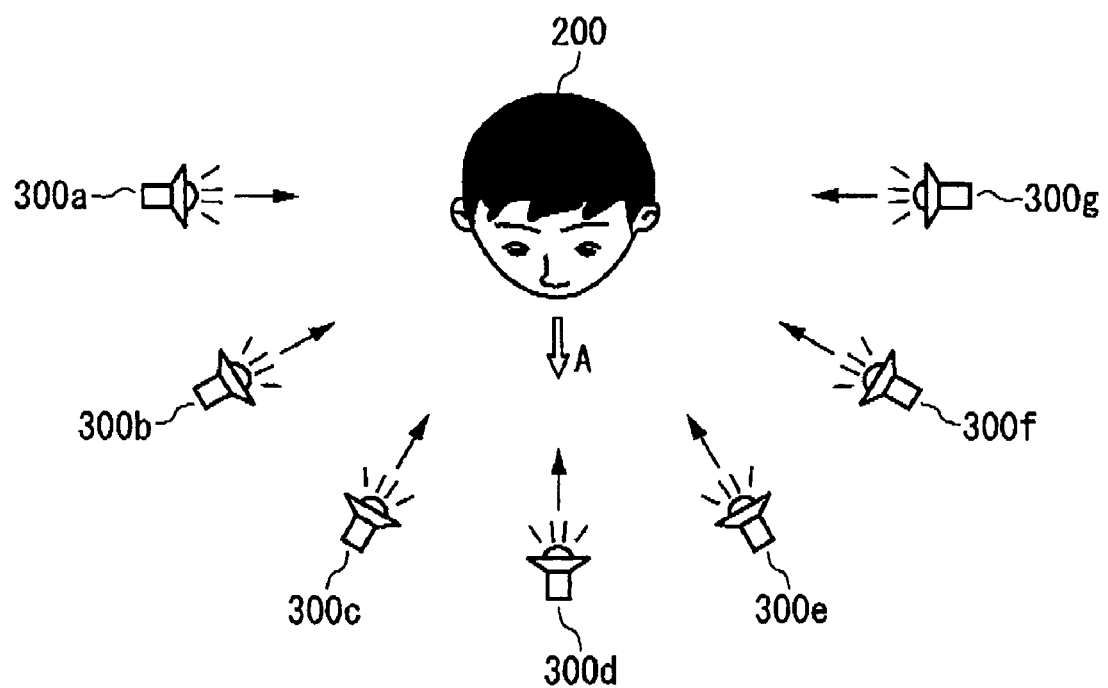
FIG. 6 shows an example of lighting apparatus provided in the authentication system 10 according to the first embodiment of the present invention.

FIG. 6 shows an example of lighting apparatus provided in the authentication system 10 according to the first embodiment of the present invention. The lighting control unit 135 controls the direction in which the lighting equipment installed in the authentication system 10 illuminates the user's face on a basis of the direction acquired by the direction calculation unit 120, to which the user's face turns. For example, as in FIG. 6, the lighting control unit 135 may control the lighting state of a plurality of the lighting equipments (300a, 300b, 300c, 300d, 300e, 300f and 300g. written as 300) illuminating the face of the user 200 in different directions from each other on a basis of the direction to which the user's face turns. In detail, in case that the user's face is illuminated from a direction of the right oblique front 30° viewed from the user, if the direction calculation unit 120 acquires that the user's face turns to the A direction, the lighting control unit 135 may make another lighting equipment 300 turned off accompanying with making the lighting equipment 300c turned on. Moreover, although the user 200 and the plurality of the lighting equipments 300 are overlooked from upwardly in FIG. 6 and each of the plurality of the lighting equipments 300 are described as being located on the same horizontal face, as a matter of fact, each of the plurality of the lighting equipments do not need to be located on the same horizontal face.

In addition, as described in FIG. 6, instead of controlling the lighting states of the plurality of the lighting equipments 300 respectively, the lighting control unit 135 controls a position or a illuminating direction of the lighting equipment which can change the position along the rails installed on the wall surface of the booth included in the authentication system 10 and can change the illuminating direction without changing the position. Here, the light control unit 135 may control the direction in which the lighting equipments 300 illuminate the user's face to be a predetermined direction as a direction in which the authentication unit 170 can identify the user more easily than another person on a basis of the face image selected by the selection unit 140. Moreover, the direction, in which the user can be identified more easily than another person, may be a direction inclined at an angle substantially between 45° and 90° in the horizontal direction with respect to the front of the user or a direction in which the user is looked down from upwardly substantially in a range from 30° to 45° and may be predetermined by a manufacturer or a manager of the authentication system 10.

As above, according to the authentication system 10, since it is possible to assure the difference of the face image between the user and another person by illuminating the user's face from the direction in which the shading of the user's face is emphasized and making a larger quantity of feature point of the user's face be included in the picked-up face image, it is possible to increase the degree of the authentication of the authentication unit 170.

In addition, in a case that at least a part of the face image is picked up, which the authentication unit 170 uses for the authentication of the user on a basis of the face image selected by the selection unit 140 among the plurality of the face images stored on the storing unit 160, the light control unit 135 may control the direction in which the lighting equipments 300 illuminate the user's face to be substantially the same as the direction in which the lighting equipments 300 or another lighting equipment installed in image pickup means picking up the face image illuminate the subject's face. As above, in case of the authentication of the user by comparing the face image of the user or the quantity of the feature point extracted from the face image with the face image stored on the storing unit 160, it is possible to detect with higher accuracy whether or not the user is the same person as a subject of the face image stored on the storing unit 160 according to making the light illuminating direction of the face image be substantially the same as that of the other face image.

Moreover, in case that the first image pickup unit 100 and the second image pickup unit 110 pick up the face images of the user which are used for the direction calculation unit 120 to acquire the direction to which the user's face turns, the lighting control unit 135 may control the direction in which the lighting equipments 300 illuminate the user's face in order to illuminate the user's face from a uniform direction. In case of calculating the direction to which the user's face turns by determining whether or not the user's face is picked up from the front by either the first image pickup unit 100 or the second image pickup unit 110, it is possible to determine whether or not the user's face is picked up from the front by determining whether or not the picked-up face image is bilaterally symmetrical. In this case, it is possible to determine whether or not the face image is bilaterally symmetrical with higher accuracy when the lighting illuminates the user's face in a uniform direction than in either the right direction or the left direction with respect to the user's face. In addition, in this case, it is possible to detect the direction to which the user's face turns with higher accuracy by illuminating the user's face from a uniform direction.

Moreover, in case that the lighting equipments 300 are installed in order that the lighting state of the red light can be controlled independently from the light in another wavelength region or both the lighting equipment 300 and another lighting equipment emitting the light in another wavelength region are installed in the authentication system 10, the lighting control unit 135 may control the direction to which the infrared light emitted by the lighting equipments 300 illuminate the user's face on a basis of the direction to which the user's face turns. In this case, it is desirable that the lighting control unit 135 does not change the direction in which the light in the different wavelength region from that of the red light illuminates the user's face and changes the direction in which the red light emitted by the lighting equipments 300 illuminate the user's face. Accordingly, in case that the direction in which the infrared light emitted by the lighting equipments 300 illuminate the user's face is controlled by the lighting control unit 135, the first image pickup unit 100 and the second image pickup unit 110 may pick up the face image of the user in the infrared light region.

In case that the direction in which the lighting equipment illuminates the user during the authentication process, there is a concern that the user might feel a physical disorder or be embarrassed. However, by means of the authentication system 10 according to the embodiment of the present invention, it is possible to perform the authentication process with high accuracy without making the user feel the change in the direction of the lighting because the direction in which the infrared light illuminates the user can be controlled and the face image can be picked up in the infrared light region.

Figure 7:
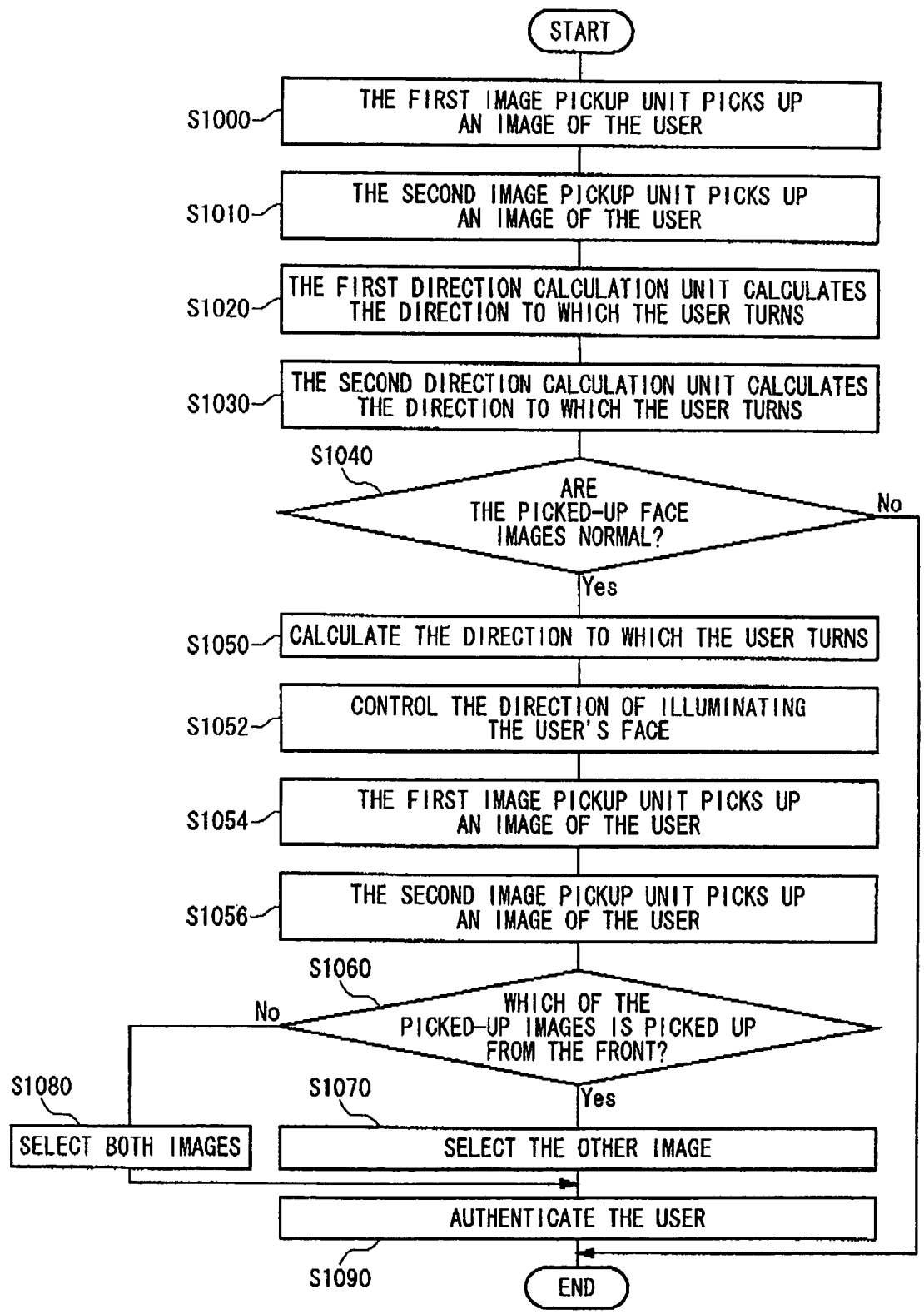
FIG. 7 is a flow chart showing an example of a flow of processing in the authentication system 10 according to the first embodiment of the present invention.

FIG. 7 is a flow chart showing an example of a flow of processing in the authentication system 10 according to the first embodiment of the present invention. First, the first image pickup unit 100 picks up the face image of the user (S1000). Here, the first image pickup unit 100 may extract a human face part from the picked-up images by using well-known technologies such as pattern matching or skin-color detection. Secondly, the second image pickup unit 110 picks up the face image of the user from the different direction from that of the first image pickup unit 100 (S1010). Thirdly, the first direction calculation unit 122 acquires the direction, to which the user's face turns, viewed from the first image pickup unit 100 on a basis of the face image picked up by the first image pickup unit 100 (S1020). Fourthly, the second direction calculation unit 124 acquires the direction, to which the user's face turns, viewed from the second image pickup unit 110 on a basis of the face image picked up by the second image pickup unit 110 (S1030). Fifthly, the lighting control unit 135 controls the direction in which the lighting equipment installed in the authentication system 10 illuminates the user's face on a basis of the direction, to which the user's face turns, acquired by the direction calculation unit 120 (S1052). Sixthly, the first image pickup unit 100 picks up the face image of the user again (S1054). Seventhly, the second image pickup unit 110 picks up the face image of the user again (S1056).

The decision unit 130 determines whether or not the images picked up by the first image pickup unit 100 and the second image pickup unit 110 respectively are normal by comparing the difference of the image pickup direction between the first image pickup unit 100 and the second image pickup unit 110 with the difference of the direction, to which the user turns, acquired by between the first direction calculation unit 122 and the second direction calculation unit 124 (S1040). For example, the directions calculated by the first direction calculation unit 122 and the second direction calculation unit 124 are 10° and 12°. Here, the calculated direction is the angle difference in case that the direction facing directly the user is 0°. Moreover, the difference of the image pickup direction between the first image pickup unit 100 and the second image pickup unit 110 is 30°. In this case, the decision unit 130 compares 2° which is the difference of the direction calculated by between the first direction calculation unit 122 and the second direction calculation unit 124 with 30° which is the difference of the image pickup direction.

Although there is an error in the directions, to which the user turns, calculated by the first direction calculation unit 122 and the second direction calculation unit 124, the difference of the direction calculated by each unit is substantially the same as that of the image pickup direction. Therefore, in case that the difference of the calculated direction and the difference of the image pickup direction exceeds a predetermined reference value, for example, it is thought that the direction of the normal face does not been picked up because the first image pickup unit 100 and the second image pickup unit 110 pick up the picture of another person illegally. In addition, it is possible to determine whether or not the picking-up the face image is performed illegally by comparing each difference according to the decision unit 130.

Accordingly, in case of determining that the picked-up image is not normal (S1040: No), the display unit 180 displays such a notice and informs an operator of the authentication system 10 that the authentication of the person fails. In case of determining that the picked-up image is normal (S1040: Yes), the direction calculation unit 120 acquires the direction to which the user's face turns on a basis of the face images picked up by the first image pickup unit 100 and the second image pickup unit 110 respectively (S1050). For example, the direction calculation unit 120 may acquire the direction to which the user's face turns by correcting the directions acquired by the first direction calculation unit 122 and the second direction calculation unit 124 according to the correction unit 126.

The selection unit 140 determines whether or not the image picked up by either the first image pickup unit 100 or the second image pickup unit 110 is picked up from the front with respect to the user (S1060). In addition, the selection unit 140 determines whether or not the direction to which the user's face turns is from the user to either the first image pickup unit 100 or the second image pickup unit 110. In case that one image from the picked-up images is picked up from the front with respect to the user (S1060: Yes), the selection unit 140 selects the other image (S1070). According to this, it is possible to select the image picked up from an oblique direction with respect to the user. Moreover, in case that the difference of the image pickup direction between the first image pickup unit 100 and the second image pickup unit 110 is substantially 15° or 30°, it is possible to select the face image by which the individual authentication can be performed at the highest accuracy. On the other hand, in case that one image from the picked-up images is not picked up from the front with respect to the user (S1060: No), the selection unit 140 selects both the images (S1080). According to this, in case that the difference of the image pickup direction between the first image pickup unit 100 and the second image pickup unit 110 is substantially 15° or 30°, although the face image by which the individual authentication can be performed at the highest accuracy can not be picked up, it is possible to increase the accuracy of the individual authentication by performing the authentication according to the plurality of the images.

Accordingly, the authentication unit 170 compares the plurality of the face images stored on the storing unit 160 with the image selected by the selection unit 140 and detects which face image is that of the user from the plurality of face images in order to authenticate the user. For example, the authentication unit 170 determines that the authentication of the user succeeds in case of detecting the image having substantially the same feature point as that of the face image selected from the plurality of the face images. Moreover, here, in case of determining that the comparison can be made at sufficiently high accuracy, for example, in case that the direction, to which the subject's face in the face image turns, corresponding to the plurality of the face images stored in the storing unit 160 is substantially the same as the direction, to which the user's face turns in the face image, selected by the selection unit 140 as a result of comparison, the authentication unit 170 may perform the authentication of the user. Accordingly, the authentication unit 170 informs the operator of the authentication system 10 of the authentication result by outputting the authentication result of the user to the display unit 180 and making the result be displayed.

Moreover, although in the explanation of the present embodiment, the user is at the intersection of the optical axis of the first image pickup unit 100 and the second image pickup unit 110, this condition is not indispensable and the user may not be at the intersection. In this case, for example, when the angle of the optical axis of the first image pickup unit 100 and the second image pickup unit 110 is 15°, even if a face image is picked up from the front, there are some cases that the direction to which the user's face turns in another face image is exactly 15°. However, even if this case, since it is possible to pick up the face image by which the individual authentication can be performed at higher accuracy, in which the direction to which the user's face turns is substantially 15°, the authentication system 10 according to the present embodiment has a significant effect. Moreover, since it is possible to perform the individual authentication with high accuracy by using the face image in which the user's face turns to the oblique direction, by which more differences of the feature point necessary for the individual authentication can be extracted from each person because the image picked up from the direction except the front can be selected even if the direction is not close to 15°, the authentication system 10 according to the present embodiment is said to have a significant effect.

Figure 8:
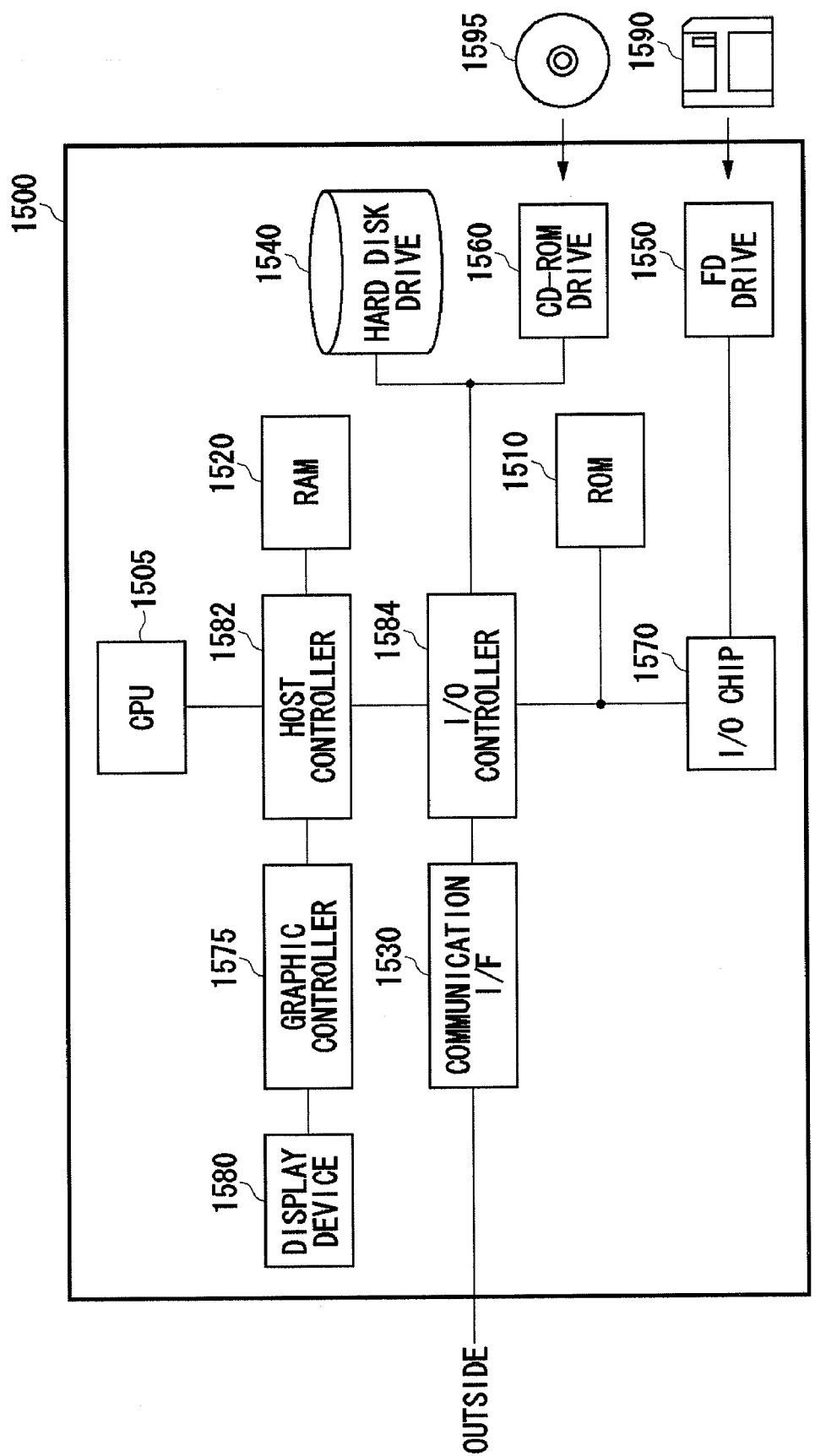
FIG. 8 is a block diagram showing an example of the hardware configuration of a computer 1500 according to the first embodiment of the present invention.

FIG. 8 is a block diagram showing an example of the hardware configuration of a computer 1500 according to the first embodiment of the present invention. The computer 1500 according to the present embodiment includes a CPU control unit including CPU 1505, RAM 1520, a graphic controller 1575 and a display device 1580 which are connected mutually by a host controller 1582, an I/O unit including communication interface connected to the host controller 1582 by the an I/O controller 1584, a hard disk drive 1540 and a CD-ROM drive 1560, a legacy I/O unit including ROM 1510 connected to the I/O controller 1584, a FD drive 1550 and an I/O chip 1570.

The host controller 1582 connects the RAM 1520 to the CPU 1505 accessing the RAM 1520 at the high transmission rate and the graphic controller 1575. The CPU 1505 operates on a basis of the programs stored on the ROM 1510 and the RAM 1520 and controls each unit. The graphic controller 1575 obtains the image data generated by the CPU 1505 on the frame buffer formed in the RAM 1520 and makes the display device 1580 execute display. Instead, the graphic controller 1575 may include the frame buffer storing the image data generated by the CPU 1505.

The I/O controller 1584 connects the host controller 1582 to the communication interface 1530 which is an I/O device at relatively high speed, the hard disk drive 1540 and the CD ROM drive 1560. The communication interface 1530 communicates with other devices via a network. The hard disk drive 1540 stores programs or data used by the CPU 1505 in the computer 1500. The CD-ROM drive 1560 reads programs or data from the CD-ROM 1595 and provides them for the hard disk drive 1540 via the RAM 1520.

Moreover, the ROM 1510, the F/D drive 1550 and the relatively low-speed I/O device of the I/O chip 1570 in the I/O controller 1584. The ROM 1510 stores a boot program executed by the computer 1500 on starting or programs depending on the hardware of the computer 1500. The FD drive 1550 reads programs or data from the FD 1590 and provides them for the hard disk drive 1540 via the RAM 1520. The I/O chip 1570 connects various kinds of the I/O device via the FD drive 1550 or such as, a parallel port, a serial port, a keyboard, and a mouse port.

The programs provided for the hard disk drive 1540 via the RAM 1520 are stored on a recording medium such as the FD 1590, the CD-ROM 1595 or an IC card and are provided for the user. The programs are read from the recording medium, are installed on the hard disk drive 1540 in the computer 1500 via the RAM 1520 and are executed by the CPU 1505. The programs installed in the computer 1500 and executed operate on the CPU 1505 and make the computer 1500 perform functions as the authentication system 10 explained with reference to FIG. 1 to FIG. 7.

The above-mentioned programs may be stored on an external recording medium. As a recording medium, an optical recording medium such as DVD, PD, a magneto optical recording medium such as MD, a tape medium, a semiconductor memory such as an IC card can be used in addition to the FD 1590, CD-ROM 1595. Moreover, a memory device, such as the hard disk installed in the sever system connected to the exclusive communication network or Internet, or RAM, may be used as the recording medium and the programs may be provided for the computer 1500 via the network.

Figure 9:
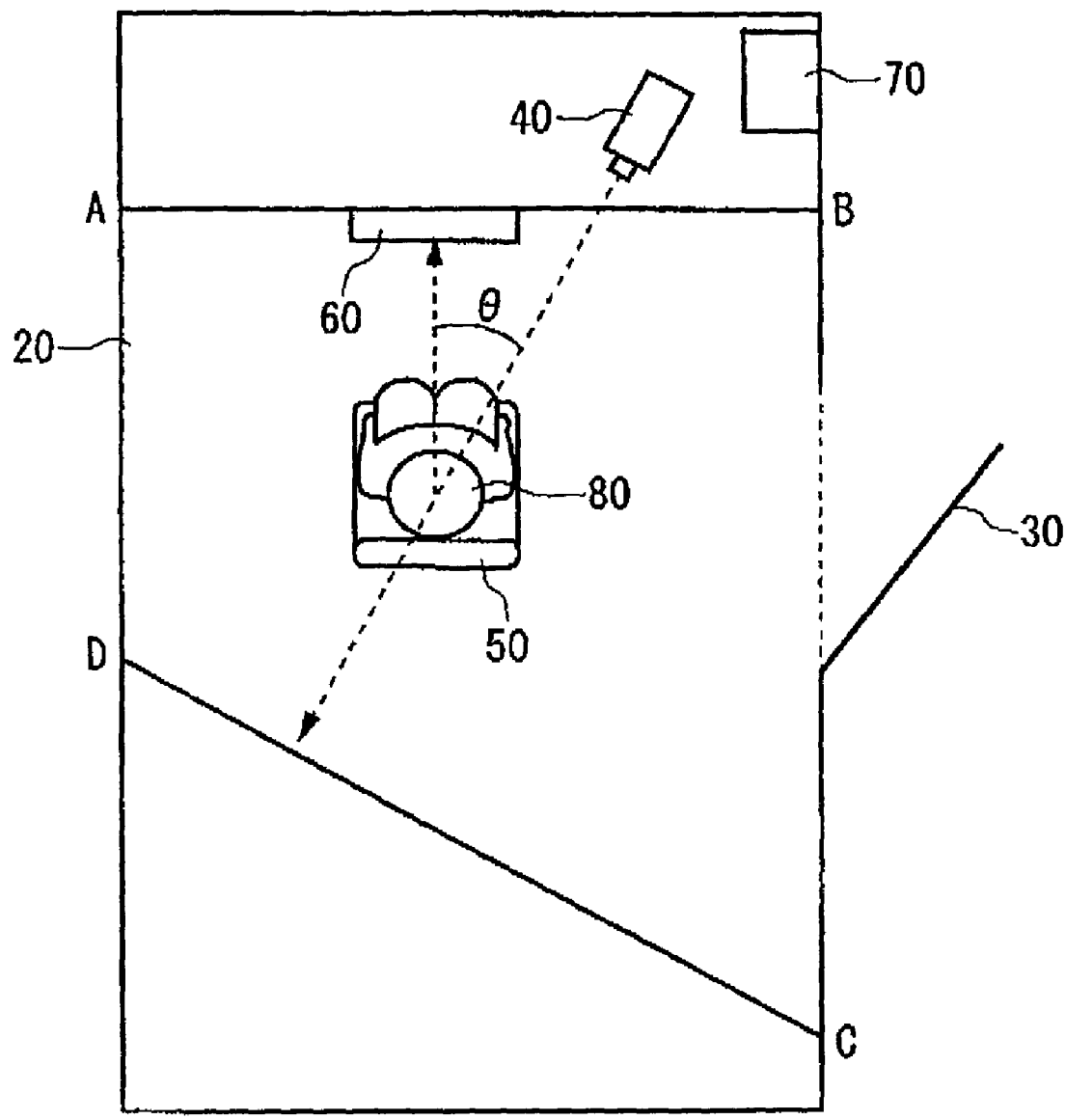
FIG. 9 shows a first example of the configuration of a certificate photograph taking apparatus 15 according to a second embodiment of the present invention.

FIG. 9 shows a first example of the configuration of a certificate photograph taking apparatus 15 according to a second embodiment of the present invention. The certificate photograph taking apparatus 15 takes a certificate photograph which can be used for a passport, a license, and an employee certificate. The certificate photograph taking apparatus 15 according to the present embodiment may be a so-called quick-processed photographing device.

The certificate photograph taking apparatus 15 according to the present embodiment intends to take a certificate photograph in which the user's face turns to the front or another direction easily without burdening the user.

As explained with reference to FIG. 2, the face image by which the individual authentication can be performed at the highest accuracy is the face image in which the subject turns to the direction inclined at substantially 15° or 30° in the horizontal direction with respect to the front. Therefore, according to the present example, the configuration of the certificate photograph taking apparatus 15 is explained in case of taking a certificate photograph in which the user's face turns to the direction inclined at substantially 15 or 30 in the horizontal direction with respect to the front.

FIG. 9 is a drawing when the inside of the certificate photograph taking apparatus 15 is looked down from above and the region where ABCD are the apexes shows the inside space 20 of the certificate photograph taking apparatus 15. The certificate photograph taking apparatus 15 includes an entrance 30, an image pickup unit 40 picking up the face image of the user, a chair 50, and a mirror 60 and an issuing unit 70. The inside space 20 has a structure where a boundary line between wall surfaces of the inside space 20 is not included in the face image of the user picked up by the image pickup unit 40. In detail, there is a rear face not parallel to the front of the direction to which the user turns in case of taking a predetermined certificate photograph in the inside space 20. In more detail, a section of the inside space 20 at least in a part of the horizontal direction is a trapezoid shape. Here, the section of the inside space 20 does not need to be an exact trapezoid shape and may be a substantial trapezoid shape.

The entrance 30 is formed in the wall surface reaching to a low edge BC of the trapezoid shape in the inside space 20. The user 80 enters the inside space 20 from the entrance 30 and the user's face image is picked up. The image pickup unit 40, for example, is a digital still camera and picks up the face image of the user 80. Here, although the face image includes the face of the user 80, it is not restricted within the image including only the face and it may include another part such as a bust-up image.

The certificate photograph taking apparatus 15 instructs the user 80 to face a different direction by a predetermined angle θ in the horizontal direction with a respect to a direction from the user 80 to the image pickup unit 40 in order that the image pickup unit 40 picks up the face image in which the face of the user 80 is inclined in the horizontal direction. Here, for example, the predetermined angle θ is substantially 15° or 30°.

In detail, the certificate photograph taking apparatus 15 instructs the user 80 in the direction to be faced by means of the chair 50 installed in order to face a direction different from the direction from the user 80 to the image pickup unit 40. Here, the chair 50 instructs the user 80 in the direction to be faced by installing a backrest to face the direction different from the direction to the image pickup unit 40. Moreover, the chair 50 may instruct the user 80 in the direction to be faced by instructing the user 80 in the position where the user 80 let his/her feet place or the direction of the feet. In detail, the chair 50 instructs the user 80 in the direction to be faced by instructing the user to place his feet in a position different from a feet position in case that the user 80 sits in the chair to face the direction of the image pickup unit 40, for example, such as giving a hollow in a pedestal. The chair 50 is an example of the direction instruction unit according to the present invention.

Moreover, in detail, the certificate photograph taking apparatus 15 instructs the user 80 in the direction to be faced by the mirror 60 installed to face the user 80 in the direction different from the direction from the user 80 to the image pickup unit 40. Accordingly, the user 80 turns to the direction different from the direction from the user 80 to the image pickup unit 40 by facing the mirror 60 directly in order to his/her image is reflected in the mirror 60. The mirror 60 is an example of the direction instruction unit according to the present invention. Moreover, the certificate photograph taking apparatus 15 may include a display device such as a CRT display or a LCD panel. In this case, the user 80 turns to the direction different from the direction from the user 80 to the image pickup unit 40 by facing the display device directly. As above, the certificate photograph taking apparatus 15 makes the user 80 turn to a direction parallel to the edges AD and BC of the trapezoid shape which is a section of the inside space 20.

On the other hand, the wall surface reaching the edge CD of the trapezoid shape in the inside space 20 is formed at an acute angle with respect to the wall surface reaching the edge BC. Moreover, the image pickup unit 40 is installed to face the user 80 in the vertical direction with respect to the wall surface of the inside space 20 reaching the edge CD. Here, the image pickup unit 40 may be installed at substantially the same height as that of the face of the user 80. According to this, the image pickup unit 40 can picks up the face image in which the face of the user 80 is inclined at an angle θ in the horizontal direction from the front. Moreover, since it is possible that the rear face of the user 80 is composed of a singular wall surface in a picked-up range of the image pickup unit 40 by making the image pickup unit 40 turn to the vertical direction with respect to the wall surface reaching the edge CD, even if in case of picking up the user 80 from the inclined direction, it is possible to prevent a crossed part of the wall surface from being picked up in the certificate photograph. Accordingly, the entrance 30 is formed on the wall surface reaching the edge BC of the trapezoid shape so that although the shielding is not perfect in the entrance 30, it is possible to decrease the directly incident external light from the entrance 30 to the image pickup unit 40 and pick up the certificate photograph with higher quality.

Accordingly, the image pickup unit 40 outputs the data of the picked-up image to the issuing unit 70. The issuing unit 70 prints out the image data picked up by the image pickup unit 40 and issues the certificate photograph to the user by discharging the data from the takeout port formed on the wall surface of the certificate photograph taking apparatus 15.

Although according to the present example, the angle θ is substantially 15° or 30°, instead of this, it may be the angle showing an error ratio higher than that of another angle in FIG. 1, such as the angle between 12° and 35°. In this case, the certificate photograph taking apparatus 15 can take the certificate photograph which can be used for the individual authentication with high accuracy.

According to the certificate photograph taking apparatus 15 in the present embodiment, it is possible to take the certificate photograph in which the face of the user 80 is inclined in the horizontal direction from the front, which can be used for the individual authentication with high accuracy. Moreover, in this case, it is possible to perform the individual authentication at higher accuracy by using the certificate photograph taken in order that the inclination of the face of the user 80 is substantially 15° or 30°. Accordingly, when a picture in which the face of the user 80 faces the inclined direction from the front is taken, it is possible to take the certificate photograph naturally without burdening the user 80 by instructing the user 80 in the direction to which the user 80 is to turn by using the chair 50 or the mirror 60.

Figure 10:
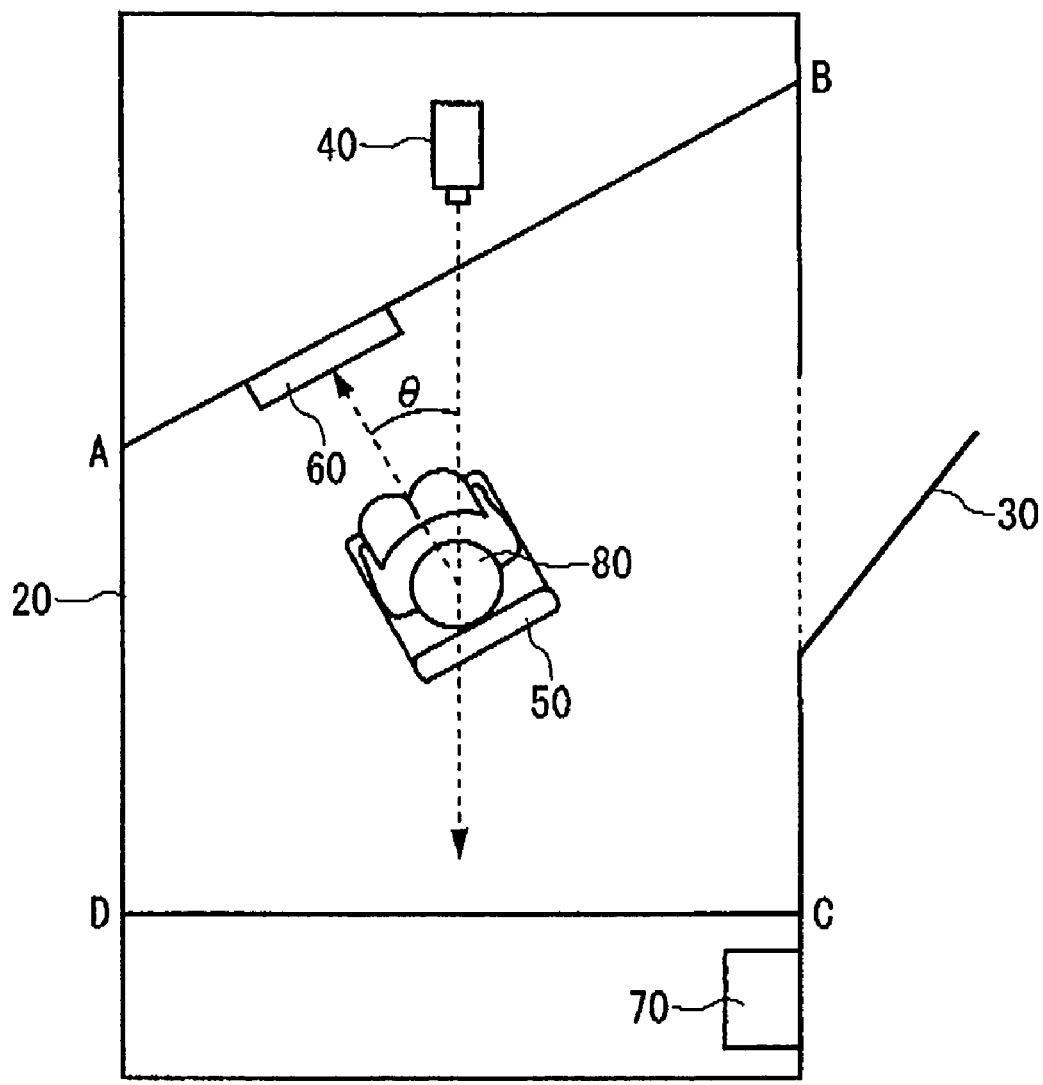
FIG. 10 shows a second example of the configuration of the certificate photograph taking apparatus 15 according to the second embodiment of the present invention.

FIG. 10 shows a second example of the configuration of the certificate photograph taking apparatus 15 according to the second embodiment of the present invention. Although the case that the view direction of the user 80 is parallel to the edge AD or BC of the trapezoid shape which is the section of the inside space 20 of the certificate photograph taking apparatus 15 is explained with reference to FIG. 9, the case that the image pickup direction of the image pickup unit 40 is parallel to the edge AD or BC of the trapezoid shape is explained with reference to FIG. 10. Moreover, only the different points of the members shown in FIG. 10 from that in FIG. 9 are explained and the explanations of the same points as that in FIG. 9 are omitted.

According to the present FIG. 10, the edge AB of the trapezoid shape which is the section of the inside space 20 in the horizontal direction is formed at an acute angle with respect to the edge BC. Accordingly, the certificate photograph taking apparatus 15 instructs the user 80 to face the vertical direction with respect to wall surface of the inside space 20 reaching the edge AD by using the chair 50 and the mirror 60. On the other hand, the image pickup unit 40 is installed in order to pick up the user 80 to face the parallel direction with respect to the wall surface reaching the edge AD and BC of the trapezoid shape, that is, the vertical direction with respect to the wall surface reaching the edge CD. According to this, the image pickup unit 40 can pickup the face image in which the face of the user 80 is inclined at an angle θ in the horizontal direction from the front.

Although the certificate photograph taking apparatus 15 takes the certificate photograph in which the face of the user 80 turns to the inclined direction in the horizontal direction with respect to the front according to FIG. 9 and FIG. 10, instead of this, the certificate photograph taking apparatus 15 may take the certificate photograph in which the face of the user 80 turns to the inclined direction in the vertical direction.

Figure 11:
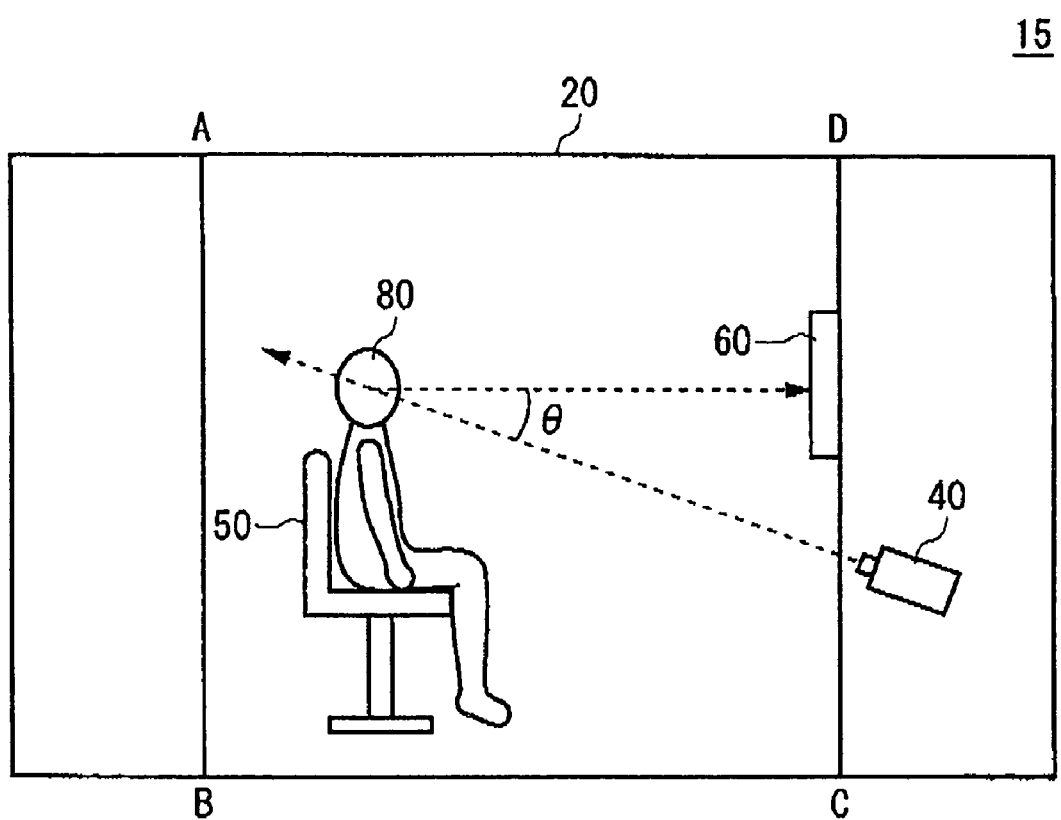
FIG. 11 shows a third example of the configuration of the certificate photograph taking apparatus 15 according to the second embodiment of the present invention.

FIG. 11 shows a third example of the configuration of the certificate photograph taking apparatus 15 according to the second embodiment of the present invention. As explained with reference to FIG. 3, the face image by which the individual authentication can be performed at the highest accuracy is the face image in which the subject turns to the direction inclined at an angle substantially between 10° and 20° upwardly with respect to the front. Therefore, according to the present example, the configuration of the certificate photograph taking apparatus 15 is explained in case that the certificate photograph taking apparatus 15 takes the certificate photograph in which the face of the user 80 turns to the direction inclined at an angle substantially between 10° and 20° upwardly with respect to the front.

FIG. 11 is a drawing when the inside of the certificate photograph taking apparatus 15 is viewed from the side and the region where ABCD are the apexes shows the inside space 20 of the certificate photograph taking apparatus 15. The certificate photograph taking apparatus 15 includes the image pickup unit 40, the chair 50 and the mirror 60. Moreover, the certificate photograph taking apparatus 15 includes the entrance 30 and the issuing unit 70 which are not shown. Accordingly, only the different points from that in FIG. 9 are explained with regard to the members shown in FIG. 11 and the entrance 30 and the issuing unit 70 which are not shown and the explanations of the same points as that in FIG. 9 are omitted.

The certificate photograph taking apparatus 15 instructs the user 80 to face the direction different by the predetermined angle θ upwardly with respect to the direction from the user 80 to the image pickup unit 40 in order that the image pickup unit 40 picks up the face image in which the face of the user 80 is inclined upwardly with respect to the front. Here, for example, the predetermined angle θ is an angle substantially between 10° and 20°. In detail, the certificate photograph taking apparatus 15 makes the user 80 turn to the horizontal direction by using the chair 50 and the mirror 60. On the other hand, the image pickup unit 40 is formed downwardly than the position of the face of the user 80 to face upwardly at the angle θ with respect to the horizontal direction. Here, the image pickup unit 40 may be formed in order that the image pickup direction and the view direction of the user 80 are on the same surface. According to this, the image pickup unit 40 can pick up the image in which the face of the user 80 is inclined at the angle θ upwardly from the front.

According to the certificate photograph taking apparatus 15 in the present embodiment, it is possible to take the certificate photograph in which the face of the user 80 is inclined upwardly from the front. Moreover, in this case, it is possible to perform the individual authentication at higher accuracy by means of the certificate photograph taken order that the inclination of the face of the user 80 is an angle substantially between 10° and 20°.

Figure 12:
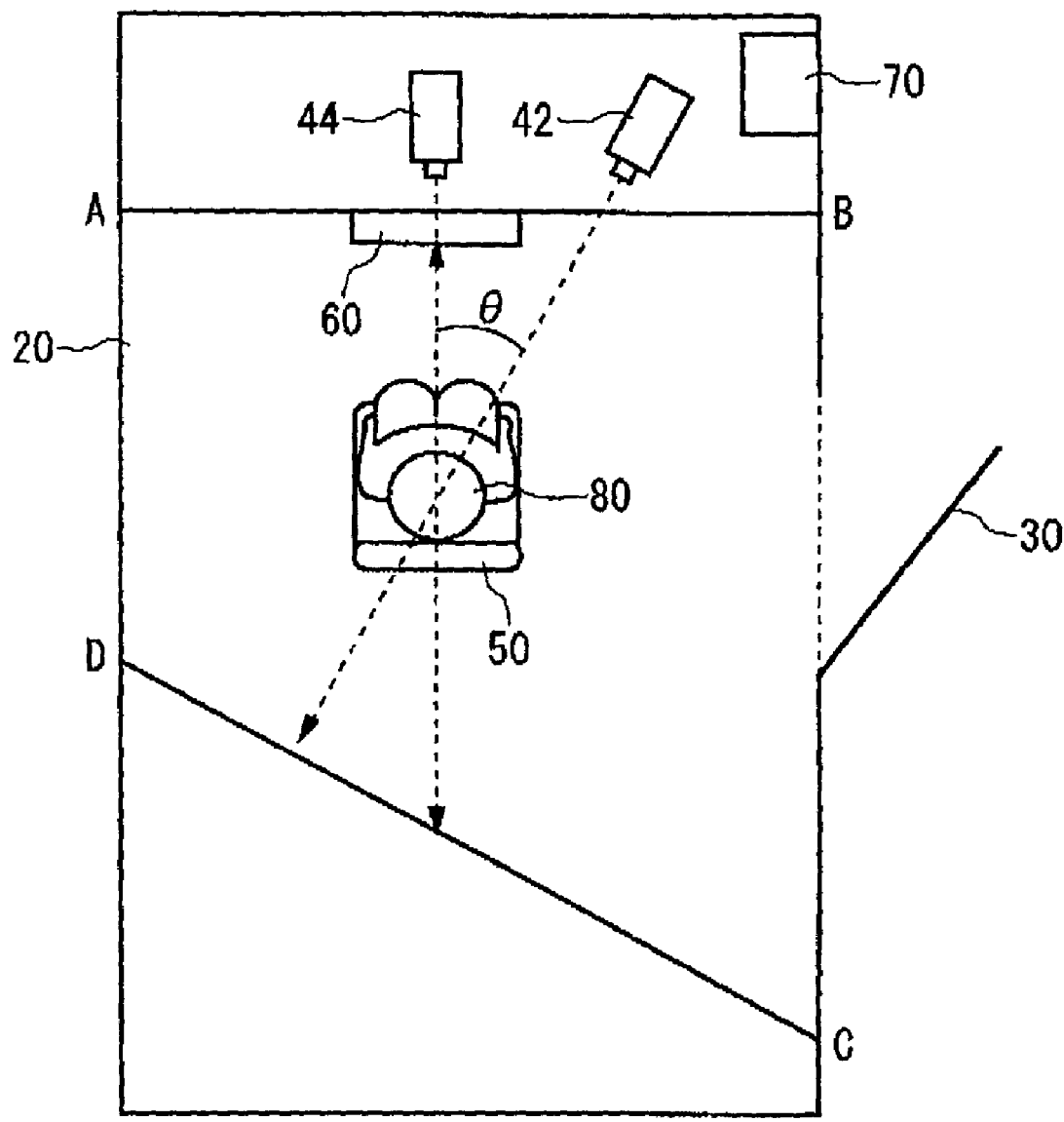
FIG. 12 shows a fourth example of the configuration of the certificate photograph taking apparatus 15 according to the second embodiment of the present invention.

FIG. 12 shows a fourth example of the configuration of the certificate photograph taking apparatus 15 according to the second embodiment of the present invention. The certificate photograph taking apparatus 15 according to the second embodiment of the present invention picks up the face image of the user 80 and issues the IC card by using the picked-up face image of the user 80. The certificate photograph taking apparatus 15 includes the entrance 30, the first image pickup unit 42, the second image pickup unit 44, the chair 50, the mirror 60 and the issuing unit 70. According to the first example of the certificate photograph taking apparatus shown in FIG. 9, the face image of the user 80 is picked up by the image pickup unit 40. However, according to the fourth example of the certificate photograph taking apparatus 15 shown in FIG. 12, the face image of the user 80 is picked up by the first image pick up unit 42 and the second image pick up unit 44. Moreover, the different points from that in FIG. 9 are explained with regard to the members included in the certificate photograph taking apparatus 15 shown in FIG. 12 and the explanations of the same points as that in FIG. 9 are omitted.

As the image pickup unit 40 shown in FIG. 9, the first image pickup unit 42 picks up the face image in which the face of the user 80 is inclined in the horizontal direction with respect to the front. Therefore, the first image pickup unit 42 outputs the image data indicating the picked-up face image to the issuing unit 70. The second image pickup unit 44 picks up the face image of the user 80 from the different direction from the first image pickup unit 42. For example, the second image pickup unit 44 makes the face image of the user 80 formed in the pickup position from the front of the user 80 and may pick up the face image in which the face of the user 80 turns to the front. Accordingly, the second image pickup unit 44 outputs the image data indicating the picked-up face image to the issuing unit 70. The issuing unit 70 prints out the face image picked up by the second image pickup unit 44 on the surface of the IC card and issues the IC card accompanying with recording the image data indicating the picked up face image in the IC chip of the IC card.

Accordingly, in case of determining that the face of the user 80 in the picked-up face image is placed within a predetermined range, the first image pickup unit 42 and the second image pickup unit 44 may not pick up the face image of the user 80. In detail, in case that a head of the user 80 does not reach a button or a headrest formed in the chair 50 where the user 80 sits, the face image of the user 80 may not be picked up. Moreover, the predetermined range may be a region where there is a blank with the size determined by the operator of the certificate photograph taking apparatus 15 on upper, lower, right and left sides accompanying with being placed at the center of the face image.

Moreover, according to the certificate photograph taking apparatus 15 in the present embodiment, it is possible to pick up the face image printed out on the surface of the IC card and the face image recorded in the IC chip of the IC card from different directions mutually. Accordingly, even if, in case that the image pickup direction of the face image printed out on the surface of the IC card is predetermined, it is possible to perform the individual authentication at higher accuracy by using the face image recorded in the IC chip instead of the face image picked up from the predetermined image pickup direction by using the IC card issued by the certificate photograph taking apparatus 15, by which the individual authentication can not be performed at sufficiently high accuracy.

Moreover, according to the certificate photograph taking apparatus 15 in the present embodiment, it is possible to pick up the face image in which the face of the user 80 is placed within the predetermined range and to issue the image as the certificate photograph or the IC card. According to this, since it is possible to prevent the problems that the face of the user 80 included in the picked-up face image is too big or too small, or a part of the face of the user 80 is not included, the individual authentication can be performed at higher accuracy in case of the individual authentication using the issued certificate photograph or the IC card. Moreover, it is possible to determine whether or not the face of the user 80 in the picked-up face image is placed within the predetermined range with high accuracy by controlling the timing when the face image is picked up on a basis of whether or not a head of the user 80 touches the headrest of the chair 50.

Figure 13:
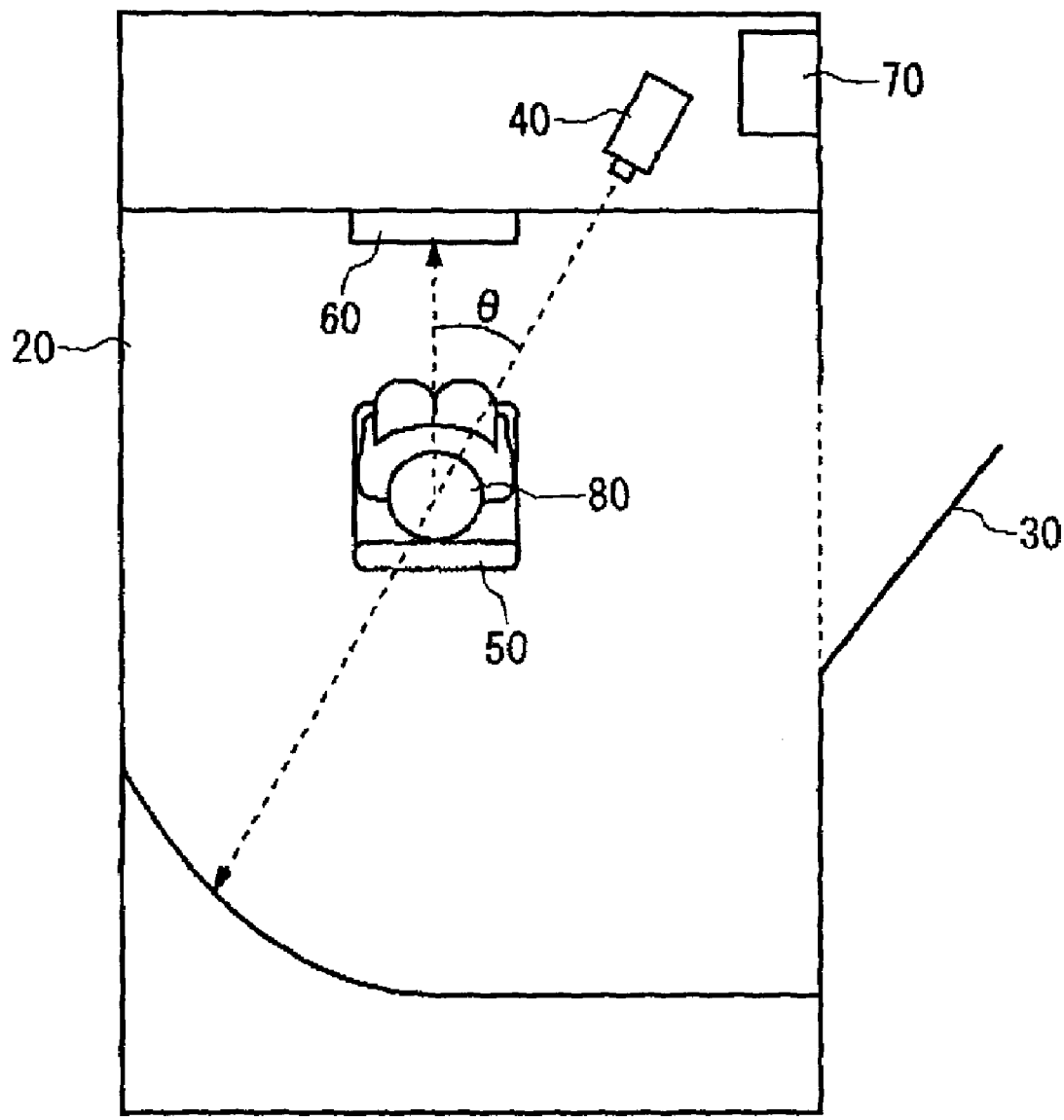
FIG. 13 shows a fifth example of the configuration of the certificate photograph taking apparatus 15 according to the second embodiment of the present invention.

FIG. 13 shows a fifth example of the configuration of the certificate photograph taking apparatus 15 according to the second embodiment of the present invention. Moreover, the different points from that in FIG. 9 are explained with regard to the members included by the certificate photograph taking apparatus 15 shown in FIG. 13 and the explanations of the same points as that in FIG. 9 are omitted. According to the first example of the certificate photograph taking apparatus 15 shown in FIG. 9, there is a wall surface of which the section in the horizontal direction is a trapezoid shape in the inside space 20. On the other hand, according to the fifth example of the certificate photograph taking apparatus 15 shown in FIG. 13, there is a wall surface formed integrally by connecting the wall surface being located behind the user 80 to the wall surface of which at least a part is included in the face image picked up by the image pickup unit 40 between the walls on the right and left sides of the user 80 by the curved surface in the inside surface 20. According to this, even if, in case of picking up the face image of the user 80 from a different position from the front of the user 80, it is possible to increase the quality of the issued certificate photograph because the image pickup unit 40 can pick up the face image not to include the boundary lines of the wall surface of the inside space 20.

Moreover, the rear face of the inside space 20 may be formed in order to automatically illuminate by an organic EL (Electro Luminescence). According to this, the projection of the shade of the user 80 on the rear face is reduced and it is possible to pick up the face image with high quality.

Moreover, according to FIG. 9 to FIG. 13, in spite of taking the certificate photograph in which the face of the user 80 is inclined in the horizontal direction or upwardly, it is possible to take the certificate photograph by using the face image picked up from various positions such as the lower right side viewed from the user 80 according to the combined configuration of these configurations and perform the individual authentication with high accuracy by using these certificate photographs.

Figure 14:
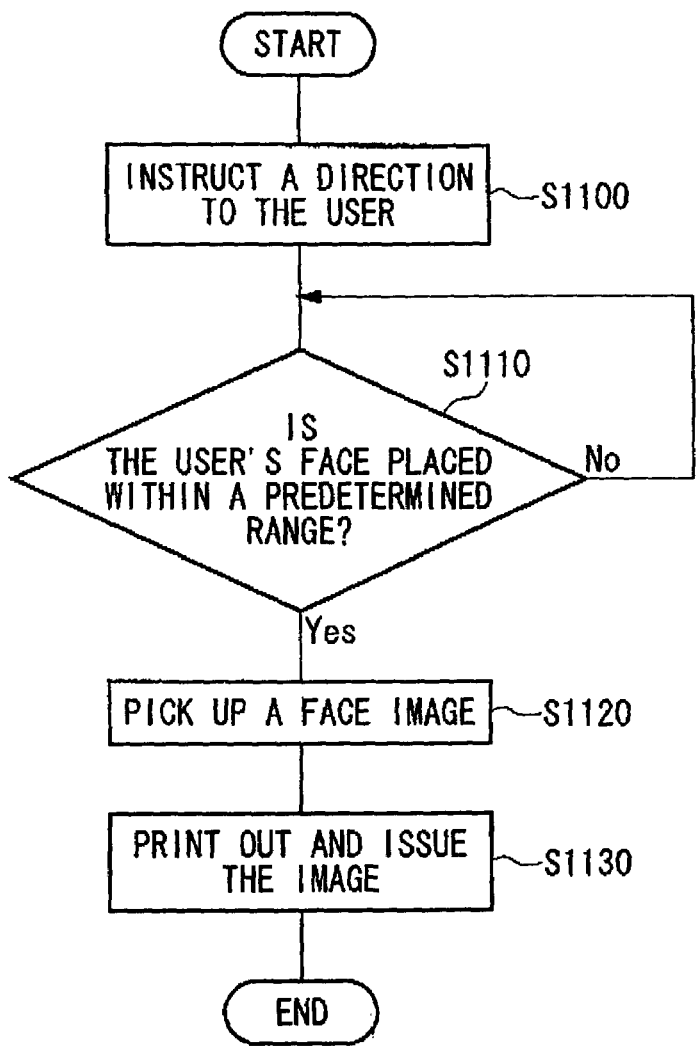
FIG. 14 is a flow chart showing an example of a flow of processing in the certificate photograph taking apparatus 15 according to the second embodiment of the present invention.

FIG. 14 is a flow chart showing an example of a flow of processing in the certificate photograph taking apparatus 15 according to the second embodiment of the present invention. First, the certificate photograph taking apparatus 15 instructs the user 80 to face the different direction by the predetermined angle with respect to the image pickup unit 40 from the user 80 (S1100). Secondly, the image pickup unit 40 determines whether or not the face of the user 80 in the picked-up face image is placed within a predetermined range (S1110). In case of determining that the face of the user 80 is not placed within the predetermined range (S1005: No), the image pickup unit 40 turns the process back to S1110 and determines again the position of the face of the user 80 in the picked-up face image. Here, the image pickup unit 40 may inform the user 80 to sit in the chair 50 in order that a head touches the headrest by using a display device or a speaker installed in the certificate photograph taking apparatus 15. On the other hand, in case of determining that the face of the user 80 is placed within the predetermined range (S1110: Yes), the image pickup unit 40 picks up the face image of the user 80 (S1120). Accordingly, the issuing unit 70 prints out the image picked up by the image pickup unit 40 and issues it to the user 80 (S1130). Here, instead of printing out and issuing the face image picked up by the image pickup unit 40 according to the issuing unit 70, the certificate photograph taking apparatus 15 may record the face image on a magnetic recording medium such as a hard disk, a semiconductor recording medium such as a flash memory, a magneto optical recording medium such as MO, an optical recording medium such as CD-R and may transmits the face image to an external device such as a sever device via network. Moreover, the certificate photograph taking apparatus 15 may further includes a face image database in which a plurality of the face images are stored previously and perform the individual authentication of the user 80 by comparing the face image picked up by the image pickup unit 40 with each of the plurality of the face images stored in the face image database. Accordingly, although in S1130, the certificate photograph taking apparatus 15 prints out and issues the face image picked up by the image pickup unit 40 in S1120, instead of this, the certificate photograph taking apparatus 15 may issue an IC card in S1130 by using the face images picked up by the first image pickup unit 42 and the second image pickup unit 44 in S1120.

Although the present invention has been described by way of exemplary embodiments, it should be understood that those skilled in the art might make many changes and substitutions without departing from the spirit and the scope of the present invention which is defined only by the appended claims.

As explained above, according to the present invention, individual authentication can be executed more precisely by clearly picking up a face image of the user whose face turns to a direction different from the front. Further, according to the present invention, when a user's face turns to a direction different from the front, a certificate photograph of the user can be easily taken without imposing a burden on the user.

What is claimed is:

1. An authentication system, which executes authentication of a user, comprising:
   a first image pickup unit for picking up a face image of the user;
   a second image pickup unit for picking up a face image of the user from a direction different from that of said first image pickup unit;
   a direction calculation unit for acquiring a direction to which the user's face turns on the basis of the face images picked up by said first and second image pickup units;
   and a selection unit for selecting at least one of the face images picked up by said first and second image pickup units on the basis of the direction to which the user's face turns,
   wherein, in case that the direction to which the user's face turns is the direction from the user to one of said first and second image pickup units, said selection unit selects the face image picked up by the other.

2. An authentication system as claimed in claim 1, wherein the authentication system further comprises an authentication unit for executing the authentication of the user making use of the face image selected by said selection unit.

3. An authentication system as claimed in claim 2, wherein
said authentication system further comprises a lighting
control unit for controlling the direction in which lighting apparatus illuminates the user's face, based on the
direction to which the user's face turns,
in case of the direction in which the lighting apparatus
illuminates having been controlled, each of said first and
second image pickup units picks up a face image of the
user again, and
said selection unit selects at least one of the face images
picked up again by said first and second image pickup
units.

4. An authentication system as claimed in claim 3, wherein
said lighting control unit controls lighting condition of each
of a plurality of lighting apparatus which illuminate the user's
face in different directions on the basis of the direction to
which the user's face turns.

5. An authentication system as claimed in claim 3, wherein
said lighting control unit controls the direction in which the
lighting apparatus illuminates the user's face so that the direction is to be a predetermined direction which makes the user
distinguishable from other persons more easily on the basis of
the face image selected by said selection unit.

6. An authentication system as claimed in claim 3, wherein
said authentication system further comprises a storage unit
for storing a plurality of face images,
when the face image selected by said selection unit is
compared with at least a part of the plurality of face
image, said authentication unit authenticates the user if
at least a part of the plurality of face images include a
face image showing similarity of which value is higher
than a predetermined reference value to the face image
selected by said selection unit, and
said lighting control unit controls the direction in which the
lighting apparatus illuminate the user's face so that the
direction is to be substantially the same with the direction in which the lighting apparatus illuminate the face
of the subject when at least a part of the plurality of the
face images are picked up.

7. An authentication system as claimed in claim 6, wherein
said lighting control unit controls the lighting apparatus to
illuminate the user's face in a uniform direction, in case that
both said first and second image pickup units pick up the face
images which are used when the direction to which the user's
face turns is acquired by said direction calculation unit.

8. An authentication system as claimed in claim 6, wherein
said lighting control unit controls the direction to which an
infrared ray emitted from the lighting apparatus illuminates the user's face on the basis of the direction to
which the user's face turns, and
each of said first and second image pickup units picks up
the user's face image in a range of infrared lay in case
that the direction in which the infrared ray illuminates
the user's face is controlled by said lighting control unit.

9. An authentication system as claimed in claim 1, wherein
said authentication system further comprises a storage unit
for storing the face image selected by said selection unit with
correspondent to the direction to which the user's face turns.

10. An authentication system as claimed in claim 1,
wherein said second image pickup unit is located so that the
angular difference in the horizontal direction between the
image pickup directions of said first and second pickup
units is substantially 15° or 30°.

11. An authentication system as claimed in claim 1,
wherein said selection unit selects the face images picked up
by both said first and second image pickup units in case
that the direction to which the user's face turns is the direction
from the user to neither said first image pickup unit nor said
second image pickup unit.

12. An authentication system as claimed in claim 1,
wherein said second image pickup unit is located so that the
angular difference in the horizontal direction between the
image pickup directions of said first and said second pickup
units is substantially 24°.

13. An authentication system as claimed in claim 1,
wherein said second image pickup unit is located so that the
angular difference in the vertical direction between the image
pickup directions of said first and said second pickup units is
between substantially 10° and 20°.

14. An authentication system as claimed in claim 1,
wherein said direction calculation unit generates the direction
to which the user's face turns as the direction from the user to
said first or said second image pickup unit by deciding
whether, for each of the face images picked up by said first
and said second image pickup units, the face image is picked
up from the front or not.

15. An authentication system as claimed in claim 1,
wherein said direction calculation unit acquires the direction
to which the user's face turns on the basis of the parallax
between the face images picked up by said first and said
second image pickup units.

16. An authentication system as claimed in claim 1,
wherein said direction calculation unit comprises:
a first direction calculation unit for acquiring the direction
to which the user's face turns viewed from said first
image pickup unit, on the basis of the face image picked
up by said first image pickup unit; and
a second direction calculation unit for acquiring the direction which the user's face turns to viewed from said
second image pickup unit, on the basis of the face image
picked up by said second image pickup unit,
said authentication system further comprises a decision
unit for deciding whether each of the face images picked
up by said first and said second image pickup units is
normal or not by comparing the difference between the
image pickup directions of said first and said second
image pickup units with the difference between the
directions to which the user's face turns acquired by said
first and said second direction calculation units.

17. An authentication system as claimed in claim 16,
wherein said direction calculation unit further comprises a
correction unit for correcting each of the directions acquired
by said first and said second direction calculation units on the
basis of the difference between the image pickup directions of
said first and said second image pickup units.

18. An authentication system as claimed in claim 1,
wherein said direction calculation unit comprises:
a first direction calculation unit for acquiring the direction
to which the user's face turns viewed from said first
image pickup unit, on the basis of the face image picked
up by said first image pickup unit; and
a second direction calculation unit for acquiring the direction which the user's face turns to viewed from said
second image pickup unit, on the basis of the face image
picked up by said second image pickup unit.

19. An authentication system as claimed in claim 18,
wherein said direction calculation unit further comprises a
correction unit for correcting each of the directions acquired
by said first and said second direction calculation units on the
basis of the difference between the image pickup directions of
said first and said second image pickup units.

20. An authentication system as claimed in claim 1, wherein the direction calculation unit dynamically acquires direction as the user's face turns.

21. An authentication system as claimed in claim 1, wherein images are picked up by the first image pickup unit and the second image pickup unit as the user's face turns through an angle.

22. An authentication system as claimed in claim 21, wherein images are picked up by the first image pickup unit and the second image pickup unit as the user's face turns through an angle, and the direction calculation unit dynamically acquires direction as the user's face turns.

23. An authentication method for executing authentication of a user, comprising:
- a first image pickup step of picking up a face image of the user,
- a second image pickup step of picking up a face image of the user from a direction different from the direction of image pickup in said first image pickup step,
- a direction calculating step of acquiring the direction to which the user's face turns on the basis of the face images picked up during said first and said second image pickup steps, and
- a selection step of selecting at least one of the images picked up in said first and said second image pickup steps on the basis of the direction to which the user's face turns, wherein, in case that the direction to which the user's face turns is the direction from the user to one of the directions of image pickup in said first and second image pickup steps, said selection step selects the face image picked up by the other.

24. A computer-readable medium storing thereon an authentication program, which makes a computer perform functions of an authentication system for executing authentication of a user, wherein
said authentication system comprises:
- a first image pickup unit for picking up a face image of the user,
- a second image pickup unit for picking up a face image of the user from a direction different from that of said first image pickup unit,
- a direction calculation unit for acquiring the direction to which the user's face turns on the basis of the face images picked up by said first and said second image pickup units, and
- a selection unit for selecting at least one of the images picked up by said first and said second image pickup units on the basis of the direction to which the user's face turns wherein, in case that the direction to which the user's face turns is the direction from the user to one of said first and second image pickup units, said selection unit selects the face image picked up by the other.

\* \* \* \* \*